(12) United States Patent
Osumi et al.

(10) Patent No.: US 6,521,034 B1
(45) Date of Patent: Feb. 18, 2003

(54) INK, INK SET, INK CARTRIDGE, RECORDING UNIT, COLOR-IMAGE RECORDING APPARATUS, IMAGE RECORDING PROCESS, COLOR-IMAGE FORMING PROCESS, AND METHOD FOR IMPROVING DENSITY OF INK-JET RECORDED IMAGE

(75) Inventors: Koichi Osumi, Kawasaki (JP); Shinya Mishina, Kawasaki (JP); Tomonari Watanabe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/662,453

(22) Filed: Sep. 14, 2000

(30) Foreign Application Priority Data

Sep. 17, 1999 (JP) .............................. 11-264618
Jun. 23, 2000 (JP) ........................ 2000-189396

(51) Int. Cl.[7] .............................................. C09D 11/02
(52) U.S. Cl. .................................. 106/31.6; 106/31.75
(58) Field of Search ..................... 106/31.6, 31.75; 427/466, 467, 468, 469

(56) References Cited

U.S. PATENT DOCUMENTS

| 4,313,124 A | 1/1982 | Hara ............................ 246/140 |
| 4,345,262 A | 8/1982 | Shirato et al. ............... 346/140 |
| 4,459,600 A | 7/1984 | Sato et al. ................... 346/140 |
| 4,463,359 A | 7/1984 | Ayata et al. ................. 346/1.1 |
| 4,558,333 A | 12/1985 | Sugitani et al. ............. 346/107 |
| 4,608,577 A | 8/1986 | Hori ............................. 346/140 |
| 4,723,129 A | 2/1988 | Endo et al. ................... 346/1.1 |
| 4,740,796 A | 4/1988 | Endo et al. ................... 346/1.1 |
| 5,218,376 A | 6/1993 | Asai .............................. 346/1.1 |
| 5,609,671 A | 3/1997 | Nagasawa ..................... 106/20 |
| 5,698,016 A | * 12/1997 | Adams et al. .............. 106/31.6 |
| 5,969,003 A | * 10/1999 | Foucher et al. ........... 106/31.27 |
| 5,976,233 A | 11/1999 | Osumi et al. ............. 106/31.86 |
| 5,997,623 A | * 12/1999 | Lin ........................... 106/31.58 |
| 6,027,210 A | 2/2000 | Kurabayashi et al. ....... 347/100 |
| 6,143,807 A | * 11/2000 | Lin et al. ..................... 523/161 |

FOREIGN PATENT DOCUMENTS

| JP | 54-56847 | 5/1979 |
| JP | 59-123670 | 7/1984 |
| JP | 59-138461 | 8/1984 |
| JP | 60-71260 | 4/1985 |
| JP | 63-152681 | 6/1988 |
| JP | 64-6074 | 1/1989 |
| JP | 8-3498 | 1/1996 |
| JP | 2783647 | 5/1998 |

* cited by examiner

Primary Examiner—Helene Klemanski
Assistant Examiner—Veronica F. Faison
(74) Attorney, Agent, or Firm—Fitzpatrick, Cella, Harper & Scinto

(57) ABSTRACT

An ink is provided which suppresses the influence of the kinds of recording media on the image quality, is excellent in image quality, effectively inhibits the occurrence of bleed upon the formation of color images, is excellent in long-term shelf stability and stably forms high quality images. The ink contains at least one salt selected from the group consisting of $(M^1)_2SO_4$, $CH_3COO(M^1)$, $Ph\text{-}COO(M^1)$, $(M^1)NO_3$, $(M^1)Cl$, $(M^1)Br$, $(M^1)I$, $(M^1)_2SO_3$ and $(M^1)_2CO_3$, wherein $M^1$ represents an alkali metal, ammonium or organic ammonium, and Ph represents a phenyl group, and a self-dispersing anionic carbon black having a functional-group density of at least 1.8 ($\mu mol/m^2$) on its surface.

29 Claims, 18 Drawing Sheets

INK, INK SET, INK CARTRIDGE, RECORDING UNIT, COLOR-IMAGE RECORDING APPARATUS, IMAGE RECORDING PROCESS, COLOR-IMAGE FORMING PROCESS, AND METHOD FOR IMPROVING DENSITY OF INK-JET RECORDED IMAGE

BACKGROUND OF THE INVENTION

1. Field of the Invention

The present invention relates to an ink, an ink set, an ink cartridge, a recording unit, a color-image recording apparatus, an image recording process, a color-image forming process, and a method for improving the density of an ink-Jet recorded image.

2. Related Background Art

Inks using carbon black which is a black colorant capable of providing prints high in optical density and excellent in fastness properties and the like have heretofore been proposed as black inks for writing utensils (fountain pens, felt-tip pens, ball-point pens, etc.) and black inks for ink-jet.

In recent years, detailed researches and developments have been made from various approaches such as composition and physical properties of inks so that good recording can be made even on plain paper such as paper for copying, paper for reporting, notepaper, letter paper, bond paper and continuous slip paper which are commonly used in offices. For example, Japanese Patent Application Laid-Open Nos. 63-152681 and 64-6074 disclose water-based pigment inks comprising carbon black and a dispersing agent. Japanese Patent Application Laid-Open No. 8-3498 has offered a technical problem that when an ink comprising carbon black together with a dispersing agent is used as an ink for ink-jet printer, ejection becomes unstable, or sufficient optical density is not achieved, and discloses a water-based pigment ink using a self-dispersing carbon black, but using no dispersing agent, as an ink capable of solving such a problem.

SUMMARY OF THE INVENTION

When printing is conducted on paper having high permeability, such as plain paper, with the conventional water-based inks, sharpness of characters printed may be impaired, or image density may be deteriorated to impair image quality in some cases In order to solve such a problem, it is considered to improve the coloring ability of inks by causing the inks not to penetrate into a recording medium as much as possible. In this case, however, another problem arises: the inks remain on the recording medium without penetrating into the recording medium, and so-called "bleeding" between different colors occurs at boundaries between them when a color image is formed.

It is therefore an object of the present invention to solve the above-described problems involved in the prior art and provide an ink, an ink set, an ink cartridge, a recording unit, a color-image recording apparatus, an image recording process and a color-image forming process which can prevent influence on image quality by the kinds of recording media, stably provide images excellent in image quality, effectively inhibit the occurrence of bleeding upon the formation of-color images and are excellent in long-term shelf stability in ink.

Another object of the present invention is to provide a water-based ink for ink- et, which can provide images extremely high in optical density, is low in dependence of the image density on recording media, has excellent stability and is hard to cause bleeding with another color ink on a recording medium when it is used in color recording.

A further object of the present invention is to provide a method for further improving the density of an image obtained by an ink-jet recording method using an ink containing a self-dispersing carbon black.

The above objects can be achieved by the present invention described below.

According to an embodiment of the present invention, there is thus provided an ink comprising at least one salt selected from the group consisting of $(M^1)_2SO_4$, $CH_3COO(M^1)$, $Ph-COO(M^1)$, $(M^1)NO_3$, $(M^1)Cl$, $(M^1)Br$, $(M^1)I$, $(M^1)_2SO_3$ and $(M^1)_2CO_3$, wherein $M^1$ represents an alkali metal, ammonium or organic ammonium, and Ph represents a phenyl group, and a self-dispersing anionic carbon black having a functional-group density of at least 1.8 ($\mu$mol/m$^2$) on its surface.

According to another embodiment of the present invention, there is also provided an ink comprising at least one salt selected from the group consisting of $(M^1)_2SO_4$, $CH_3COO(M^1)$, $Ph-COO(M^1)$, $(M^1)NO_3$, $(M^1)Cl$, $(M^1)Br$, $(M^1)I$, $(M^1)_2SO_3$ and $(M^1)_2CO_3$, wherein $M^1$ represents an alkali metal, ammonium or organic ammonium, and Ph represents a phenyl group, and a self-dispersing anionic carbon black having a functional-group density of at least 0.45 (mmol/g) on its surface, the ink undergoing no substantial change in viscosity even when it is stored for one month in an environment of 60° C.

According to an embodiment of the present invention, there is further provided an ink set comprising in combination a water-based color ink comprising at least one coloring material selected from among coloring materials for cyan, magenta, yellow, red, green and blue, and the above-described ink according to the present invention.

According to an embodiment of the present invention, there is still further provided an ink cartridge comprising an ink tank which contains the above-described ink according to the present invention According to an embodiment of the present invention, there is yet still further provided a recording unit comprising an ink container portion containing an ink-jet ink and a head portion for ejecting the ink, the ink-jet ink comprising at least one salt selected from the group consisting of $(M^1)_2SO_4$, $CH_3COO(M^1)$, $Ph-COO(M^1)$, $(M^1)NO_3$, $(M^1)Cl$, $(M^1)Br$, $(M^1)I$, $(M^1)_2SO_3$ and $(M^1)_2CO_3$, wherein $M^1$ represents an alkali metal, ammonium or organic ammonium, and Ph represents a phenyl group, and a self-dispersing anionic carbon black having a functional-group density of at least 1.8 ($\mu$mol/m$^2$) on its surface.

According to an embodiment of the present invention, there is yet still further provided an image recording apparatus comprising an ink-jet ink and a recording head for ejecting the ink, the ink-jet ink comprising at least one salt selected from the group consisting of $(M^1)_2SO_4$, $CH_3COO(M^1)$, $Ph-COO(M^1)$, $(M^1)NO_3$, $(M^1)Cl$, $(M^1)Br$, $(M^1)I$, $(M^1)_2SO_3$ and $(M^1)_2CO_3$, wherein $M^1$ represents an alkali metal, ammonium or organic ammonium, and Ph represents a phenyl group, and a self-dispersing anionic carbon black having a functional-group density of at least 1.8 ($\mu$mol/m$^2$) on its surface.

According to another embodiment of the present invention, there is yet still further provided a color-image recording apparatus comprising an ink container portion containing an ink-jet ink comprising at least one salt selected from the group consisting of $(M^1)_2SO_4$, $CH_3COO(M^1)$, Ph-COO($M^1$), ($M^1$)$NO_3$, ($M^1$)Cl, ($M^1$)Br, ($M^1$)I, ($M^1$)$_2$$SO_3$ and ($M^1$)$_2$$CO_3$, wherein $M^1$ represents an alkali metal, Ammonium or organic ammonium, and Ph represents a phenyl group, and a self-dispersing anionic carbon black having a functional-group density of at least 1.8 ($\mu$mol/m$^2$) on its surface, another ink container portion containing a water-based, ink-set color ink comprising at least one coloring material selected from among coloring materials for cyan, magenta, yellow, red, green and blue, and recording head portions for respectively ejecting the inks contained in the respective ink container portions.

According to an embodiment of the present invention, there is still further provided an image recording process comprising the step of ejecting an ink-jet ink comprising at least one salt selected from the group consisting of ($M^1$)$_2$$SO_4$, $CH_3COO(M^1)$, Ph-COO($M^1$), ($M^1$)$NO_3$, ($M^1$)Cl, ($M^1$)Br, ($M^1$)I, ($M^1$)$_2$$SO_3$ and ($M^1$)$_2$$CO_3$, wherein $M^1$ represents an alkali metal, ammonium or organic ammonium, and Ph represents a phenyl group, and a self-dispersing anionic carbon black having a functional-group density of at least 1.8 ($\mu$mol/m$^2$) on its surface toward the surface of a recording medium to apply the ink to the surface thereof, thereby recording an image.

According to an embodiment of the present invention, there is still further provided a process for forming a color image comprising the steps of ejecting a first water-based, ink-jet ink comprising at least one coloring material selected from among coloring materials for cyan, magenta, yellow, red, green and blue toward the surface of a recording medium to apply the ink to the surface thereof; and ejecting a second ink-jet ink comprising at least one salt selected from the group consisting of ($M^1$)$_2$$SO_4$, $CH_3COO(M^1)$, Ph-COO($M^1$), ($M^1$)$NO_3$, ($M^1$)Cl, ($M^1$)Br, ($M^1$)I, ($M^1$)$_2$$SO_3$ and ($M^1$)$_2$$CO_3$, wherein $M^1$ represents an alkali metal, ammonium or organic ammonium, and Ph represents a phenyl group, and a self-dispersing anionic carbon black having a functional-group density of at least 1.8 ($\mu$mol/m$^2$) on its surface toward the surface of the recording medium to apply the second ink to the surface thereof.

When such constitution is adopted, the dispersibility of the self-dispersing carbon black in the ink can be still more stabilized by making the functional-group density on its surface a level as high as at least 1.8 ($\mu$mol/m$^2$) or at least 0.45 (mmol/g). On the other hand, the salt is contained in the ink, whereby solid-liquid separation in the ink after the ink is applied to the recording medium can be quickly caused, and so both stability of self-dispersing carbon black in the ink and the image density by the ink, which have heretofore been considered to be difficult to be reconciled can be reconciled at a high level. By making solid-liquid separation faster, the bleeding with another ink on the recording medium when such an ink is used in recording of color images can be effectively inhibited.

According to another embodiment of the present invention, there is yet still further provided a water-soluble ink-jet ink comprising a self-dispersing carbon black having an average particle diameter of at least 90 nm and stably dispersed in an aqueous medium, and a salt, wherein the density of an image obtained by the ink is lowered when the salt is not contained.

According to an embodiment of the present invention, there is yet still further provided a method for improving the image density of an ink-jet recorded image formed with an ink comprising a self-dispersing carbon black having an average particle diameter of at least 90 nm and stably dispersed in an aqueous medium, the method comprising causing a salt to be contained as an agent for inhibiting penetration of the self-dispersing carbon black into the interior of a recording medium in the inks By adopting such an embodiment, an image having such a high density that cannot be achieved by the sole use of self-dispersing carbon black having a great particle diameter can be obtained.

DESCRIPTION OF THE PREFERRED EMBODIMENTS

Figure 1:
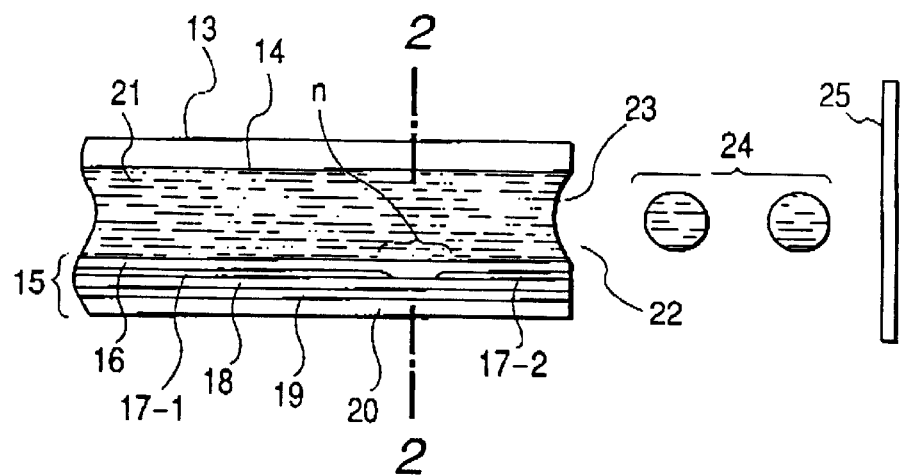
FIG. 1 is a longitudinal cross-sectional view illustrating a head of an ink-jet recording apparatus according to an embodiment.

The present invention will hereinafter be described in detailed by the preferred embodiments of the invention.

An ink according to an embodiment of the present invention comprises as a colorant, a self-dispersing anionic carbon black having a functional-group density of at least 1.8 ($\mu$mol/m$^2$) on the surface thereof, and a specific salt. An ink according another embodiment of the present invention comprises the specific salt and a self-dispersing anionic carbon black having a functional-group density of at least 0.45 (mmol/g) on its surface, and undergoes no substantial change in viscosity even when it is stored for one month in an environment of 60° C. The inks are generally prepared by dispersing or dissolving these components in an aqueous medium. The dispersion stability of the self-dispersing carbon black in the inks can be further improved by selecting self-dispersing carbon black having such functional-group density on its surface as described above.

The components of the inks will be described in detail.
(Salt)

The specific salt is first described in detail. The salt is at least one selected from the group consisting of $(M^1)_2SO_4$, $CH_3COO(M^1)$, $Ph\text{-}COO(M^1)$, $(M^1)NO_3$, $(M^1)Cl$, $(M^1)Br$, $(M^1)I$, $(M^1)_2SO_3$ and $(M^1)_2CO_3$, wherein $M^1$ represents an alkali metal, ammonium or organic ammonium, and Ph represents a phenyl group. Examples of the alkali metal represented by $M^1$ include Li, Na, K, Rb and Cs. Examples of the organic ammonium include methylammonium, dimethylammonium, trimethylammonium, ethylammonium, diethylammonium, triethylammonium, trihydroxymethylamine, dihydroxymethylamine, monohydroxymethylamine, monoethanolammonium, diethanolammonium and triethanolammonium These ammonium groups are derived from their corresponding organic amines.

The inks are so constituted that such a salt as described above is caused to be contained in an ink containing a self-dispersing anionic carbon black having a functional-group density of at least 1.8 ($\mu$mol/m$^2$) on the surface thereof, which will be described subsequently, whereby the formation of high-quality images becomes feasible even when printing is conducted on paper having high permeability, by which high-quality images have been hard to provide with usual water-based inks, for example, plain paper. For example, when printing is conducted on paper having high permeability with the conventional water-based inks, sharpness of characters printed may be impaired, or image density may be deteriorated in some cases. According to the inks, however, such difficulties are solved. The reason why such excellent effects are achieved is not clearly known, but the present inventors believe it as follows.

For example, when the ink is ejected onto the surface of paper as a recording medium by an ink-jet method to apply it thereto, solid-liquid separation quickly occurs in the ink after it is deposited to the paper surface though a carbon black pigment as a colorant is stably dispersed in the ink (as factors for causing this solid-liquid separation, capillarity, evaporation of water, etc. are considered). Therefore, the above-described phenomenon that the sharpness or density of the image is impaired is considered to hardly occur. More specifically, if the solid-liquid separation in the ink occurs slowly on a recording medium, the whole ink diffuses into paper used as the recording medium when the paper has high permeability. As a result, the sharpness (character quality) of characters printed is impaired, and at the same time the image density is naturally lowered because the ink deeply penetrates into the paper. However, when the solid-liquid separation on the recording medium occurs quickly like the ink, the colorant becomes hard to penetrate into the interior of the paper, and so deep penetration of the colorant into the recording medium such as paper does not occur When the ink, which quickly undergoes solid-liquid separation on the recording medium, is used, a high-quality image that is excellent in color developing property and does not impair sharpness and the like can be obtained irrespective of the kind of the recording medium used (in other words, the image is hardly affected by factors depending on the kind of paper, such as the degree of permeability) even when printing is conducted on paper having relatively high permeability. Further, the use of the ink also brings about such an effect that the image density (reflection density) is enhanced due to the above-described phenomenon as compared with the use of an ink to which the salt is not yet added when the same paper is used for printing.

The present inventors believe that the greatest factor for the rapid solid-liquid separation of the ink resides in evaporation of water after ejection. Of course, capillarity in the paper to which the ink is applied is also a factor causing the solid-liquid separation. However, the present inventors consider that the greatest factor by which the solid-liquid separation on the recording medium is quickly caused as to the ink resides in evaporation of water after ejection on the basis of the following fact. As the result of an investigation by the present inventors, it has been found that the ink undergoes solid-liquid separation more quickly compared with an ink containing no salt even on a clean glass surface.

Namely, this fact truly indicates that the ink undergoes the solid-liquid separation even in a state that the capillarity does not occur. Accordingly, the present inventors conclude that the greatest factor that causes the solid-liquid separation in the ink is evaporation of water after ejection.

Further, the ink has another effect that when it is used in the formation of a color image, the occurrence of bleeding of different colors at the boundaries between them can be effectively prevented Such an effect is also considered to be attributable to the rapid solid-liquid separation of the ink on the recording medium. More specifically, when the solid-liquid separation of the ink occurs quickly, the solvent in the ink is immediately separated from the colorant and penetrates deeply into paper, so that the solidification of the colorant rapidly occurs. As a result, even when inks of different hues are ejected so as to overlap each other on the paper upon the formation of a color image, the colorant in one of the inks is hard to bleed out on the side of the adjacent ink of different color, so that the occurrence of bleeding is effectively prevented. In addition, since the ink uses a self-dispersing anionic carbon black having a specific functional-group density on its surface as a colorant, the ink is prevented from increasing its viscosity during a long-term storage. As a result, the ink is excellent in the long-term shelf stability. This is considered to contribute to the achievement of stable formation of high-quality images.

(Self-dispersing Carbon Black)

The self-dispersing anion carbon black contained as a colorant in the inks will hereinafter be described in detail. Examples of the self-dispersing carbon black making up the inks according to the present invention include anionically charged carbon black to the surface of which at least one hydrophilic group is bonded directly or through another atomic group. When a carbon black having such a structure is used, it is unnecessary to add a dispersing agent for dispersing the carbon black to an ink like the conventional inks.

Examples of the self-dispersing carbon black anionically charged include those obtained by bonding to the surface of carbon black, for example, any of hydrophilic groups as described below:

—COO($M^2$), —SO$_3$($M^2$)$_2$, —PO$_3$H($M^2$) and —PO$_3$($M^2$)$_2$ wherein $M^2$ is a hydrogen atom, alkali metal, ammonium or organic ammonium.

Of these, the carbon black anionically charged by bonding a hydrophilic group such as —COO($M^2$) or —SO$_3$($M^2$)$_2$ to the surface thereof can be particularly preferably used as a colorant for the inks according to the present invention since its dispersibility in the inks is good. Of those represented by "$M^2$" in the above-described hydrophilic groups, specific examples of the alkali metal include Li, Na, K, Rb and Cs, and specific examples of the organic ammonium include methylammonium, dimethylammonium, trimethylammonium, ethylammonium, diethylammonium, triethylammonium, monohydroxymethyl-amine, dihydroxymethylamine and trihydroxymethylamine.

The ink containing self-dispersing carbon black, in which $M^2$ is ammonium, as a colorant can more improve the water fastness of recorded images formed therefrom. Accordingly, such carbon black can be particularly preferably used from such a point of view. This is considered to be attributable to the fact that when such an ink is applied to a recording medium, the ammonium is decomposed to evaporate ammonia, and then the hydrophilic group bonded to the surface of carbon black becomes H type to lose its hydrophilicity. The self-dispersing carbon black, in which $M^2$ is ammonium, can be prepared in accordance with, for example, a process in which self-dispersing carbon black, in which $M^2$ is an alkali metal, is subjected to ion-exchange to substitute ammonium for the alkali metal ($M^2$), or a process in which an acid is added to the self-dispersing carbon black to change it into the H type, and ammonium hydroxide is then added to substitute ammonium for H ($M^2$).

As a method for preparing the anionically charged self-dispersing carbon black, may be mentioned, for example, a process in which carbon black is subjected to an oxidation treatment with sodium hypochlorite. By this process, a —COONa group, which is a hydrophilic group, can be chemically bonded to the surface of carbon black.

Such various hydrophilic groups as described above may be directly bonded to the surface of carbon black. Alternatively, they may be indirectly bonded to the surface of carbon black by intervening another atomic group between the surface of carbon black and such a hydrophilic group. Specific examples of the atomic group include linear or branched alkylene groups having 1 to 12 carbon atoms, a substituted or unsubstituted phenylene group, and a substituted or unsubstituted naphthylene group. Examples of substituent groups on the phenylene group and the naphthylene group include linear or branched alkyl groups having 1 to 6 carbon atoms. Specific examples of the combination of the atomic group and the hydrophilic group include —C$_2$H$_4$—COO($M^2$), —Ph-SO$_3$($M^2$)$_2$ and —Ph-COO($M^2$), wherein Ph is a phenylene group.

In the present invention, two or more kinds of self-dispersing carbon black may be suitably selected from among the above-described self-dispersing carbon black to use them as a colorant for ink. The amount of the self-dispersing carbon black added into the ink is preferably within a range of from 0.1 to 15% by weight, particularly preferably from 1 to 10 % by weight based on the total weight of the ink. By controlling the amount of the self-dispersing carbon black within this range, the self-dispersing carbon black can maintain a satisfactorily dispersed state in the ink When the ink according to the present invention is prepared, a publicly known dye may be added as another colorant in addition to the self-dispersing carbon black for the purpose of adjusting the color tone of the ink.

Among the above-described various kinds of self-dispersing carbon black, $M^2$ in the following hydrophilic groups bonded to the surface of carbon black is particularly preferably ammonium or organic ammonium as described above:

—COO($M^2$), —SO$_3$($M^2$)$_2$, —PO$_3$H($M^2$) or —PO$_3$($M^2$)$_2$, wherein $M^2$ is a hydrogen atom, alkali metal, ammonium or organic ammonium.

The investigation by the present inventors has revealed that the salt used in combination with the self-dispersing carbon black in the inks according to the present invention is preferably a salt in which $M^1$ among the following salts is identical with $M^2$:

($M^1$)$_2$SO$_4$, CH$_3$COO($M^1$), Ph-COO($M^1$), ($M^1$)NO$_3$, ($M^1$)Cl, ($M^1$)Br, ($M^1$)I, ($M^1$)$_2$SO$_3$ and ($M^1$)$_2$CO$_3$, wherein $M^1$ represents an alkali metal, ammonium or organic ammonium, and Ph represents a phenyl group.

More specifically, the present inventors have found in the course of an investigation as to the effects by the addition of a salt to an ink comprising self-dispersing carbon black that when $M^2$ (counter ion) in the hydrophilic group of the self-dispersing carbon black is made identical with $M^1$, the stability of the ink is particularly improved. The reason why such an effect is achieved by making $M^1$ identical with $M^2$ is not clearly known. However, it is considered that since no salt interchange occurs between the counter ion in the hydrophilic group of the self-dispersing carbon black and the salt in the Ink, the dispersion stability of the self-dispersing carbon black is stably maintained.

When both $M^1$ and $M^2$ are made ammonium, the water resistance or fastness of the resulting recorded images can be more improved in addition to the effect of stabilizing the properties of the ink. When Ph-COO(NH$_4$) (ammonium benzoate) is used as the salt to be contained in the ink at this time, a far excellent effect can be achieved even in the reejection stability of the ink from an orifice in an ink-jet head after ink-jet recording is suspended.

As the result of a further investigation by the present inventors, it has been found that when carbon black having a functional-group density of at least 1.8 ($\mu$mol/m$^2$) on the surface thereof among such anionically charged self-dispersing carbon black as described above is used, an increase in viscosity of the ink by long-term storage is prevented even when the above-described salt necessary to effectively prevent bleeding is added to the ink, so that an ink far excellent in long-term shelf stability can be provided without adding any dispersing agent or dispersion aid.

As a method for measuring the functional-group density on the surface at this time, there is, for example, a method in which a carbon dispersion is purified, all counter ions are changed to sodium ions, the amount of the sodium ions is measured by a probe type sodium ion electrode to convert a concentration of the dispersion into ppm per solid. The conversion is conducted supposing that the hydrophilic group such as a carboxylic group is present in the same number of moles as the counter ion, i.e., sodium ion. If the functional-group density on the surface is too high in the present invention, it is considered that such self-dispersing carbon black becomes hard to form secondary particles in the ink, and the carbon black is present as primary particles in the ink. If the self-dispersing carbon black is present as primary particles in the ink, it is expected that the effect of improving the image density in an aspect of the present invention may be somewhat limited in some cases. In order to achieve the best effect, preferably, the functional-group density on the surface of the self-dispersing carbon black should not be enhanced to such an extent that the self-dispersing carbon black cannot form secondary particles in the ink.

Figure 12:
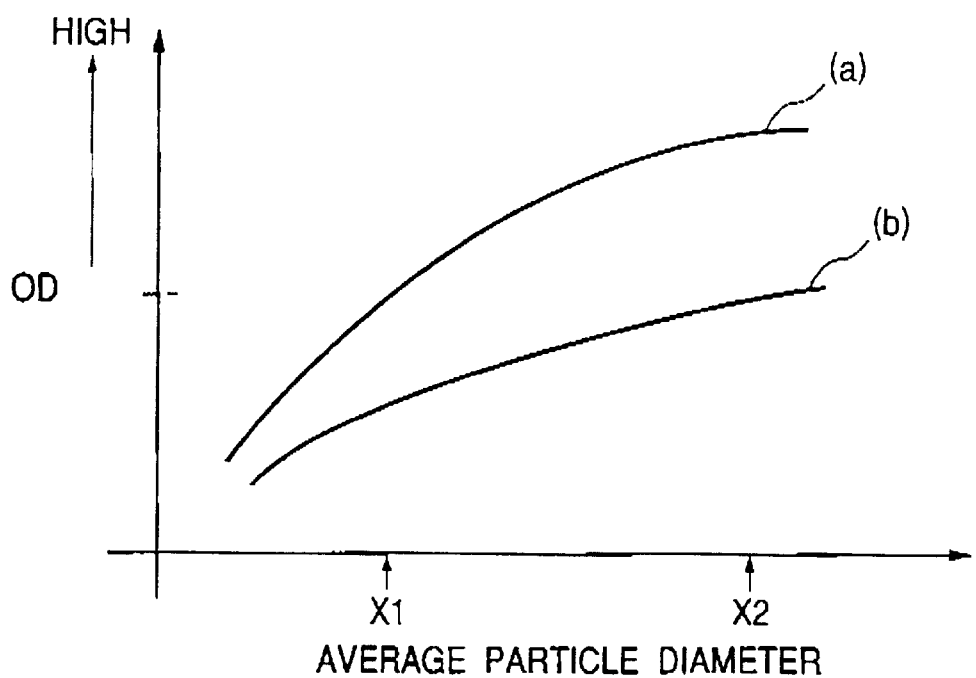
FIG. 12 diagrammatically illustrates the tendency of changes in density of images obtained by a salt-containing ink and an ink containing no salt when the average particle diameter of self-dispersing carbon black contained in both inks is changed.

When an image is formed with the ink to which the salt is added as described above, the reflection density (image density) can be increased compared with the case where the ink to which the salt is not yet added is used. This is an advantageous effect of the present invention. According to a further detailed investigation by the present inventors, the effect of the salt added to the ink according to the present invention is exhibited to the maximum when the self-dispersing carbon black having a great average particle diameter is used as a coloring material. In FIG. 12, an axis of abscissa indicates an average particle diameter of the self-dispersing carbon black as a coloring material in an ink, and an axis of ordinate indicates an optical density (OD) of an image obtained by such an ink. FIG. 12 shows how changes in the average particle diameter of the self-dispersing carbon black influence the density of images obtained by two inks containing the self-dispersing carbon black as a coloring material, one of which contains the salt and the other of which contains no salt. When ODs of the images obtained by the ink (a solid line, a) to which the salt has been added, and the ink (a solid line, b) to which no salt has been-added are compared with each other, it is understood that the OD-improving effect of the ink to which the salt has been added becomes greater as the average particle diameter of the self-dispersing carbon black increases. In other words, the results shown in FIG. 12 indicate that to simply enlarge the average particle diameter of the carbon black may not be directly related with a great improvement in OD in some cases.

Figure 13:
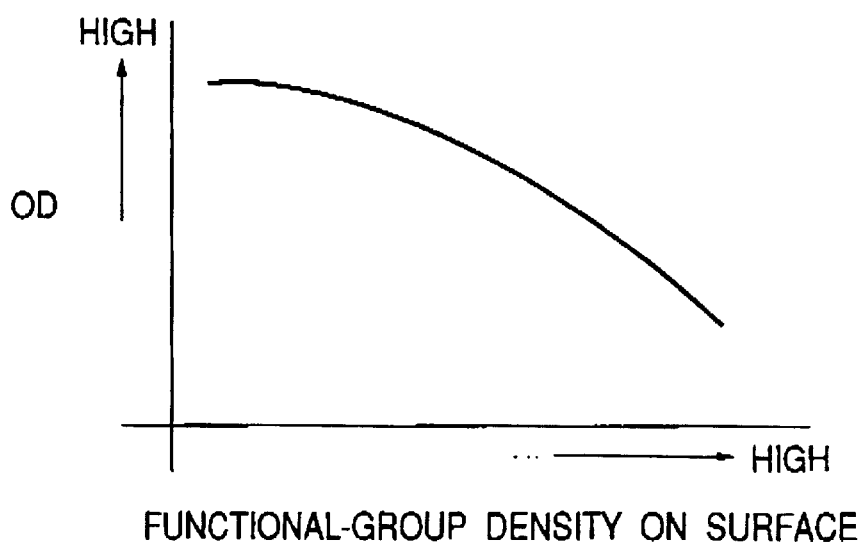
FIG. 13 schematically diagrammatically illustrates the relationship between the functional-group density on the surface of self-dispersing carbon black and the density of an image obtained by an ink containing such carbon black.

The reason why such a phenomenon occurs is not clarified. However, it is considered that a reason resides in that the self-dispersing carbon black is stably dispersed in the ink because of the functional group on the surface thereof. Namely, as illustrated in FIG. 13, the self-dispersing carbon black tends to reduce OD when the functional-group density on its surface is enhanced. This is considered to be attributable to the improvement of dispersibility of the carbon black. The improvement itself of dispersibility is preferred from the viewpoint of application of the self-dispersing carbon black to an ink-jet ink. However, such carbon black is easy to penetrate into a recording medium together with a solvent when it is applied to the recording medium as an Ink. In FIG. 12, the reason why there is little difference between OD of the image by an ink containing carbon black A having a prescribed average particle diameter (×1) and the salt and OD of the image by an Ink containing carbon black B having a relatively greater average particle diameter (×2) and containing no salt is considered to be due to the fact that the carbon black B penetrates into the recording medium, whereas the carbon black A undergoes rapid solid-liquid separation on the surface of the recording medium by the action of the salt, and so OD substantially equal to that of the carbon black B is achieved though its particle diameter is smaller than the carbon black B.

The reason why an ink containing carbon black B and the salt exhibits very high OD as Illustrated in FIG. 12 is considered to be due to the fact that the carbon black is effectively prevented from penetrating into the interior of the recording medium by the rapid solid-liquid separation by the action of the salt as described above, and the effect brought about by using the carbon black having a greater particle diameter is exhibited to the maximum.

The effect of achieving high OD by using the self-dispersing carbon black having a great particle diameter and the salt in combination is not such a critical effect that can suddenly be enjoyed from a particular particle diameter. However, when carbon black having an average particle diameter of at least 90 nm is used as the self-dispersing carbon black, the effect of improved OD due to the addition of the salt is visually and clearly recognized When the average particle diameter of the self-dispersing anionic carbon black In the ink is small, the effect of increasing the reflection density due to the addition of the salt is not very great because the reflection density of the carbon black itself is low. On the other hand, when the average particle diameter of the self-dispersing anionic carbon black is greater, the effect of increasing the reflection density due to the addition of the salt is more marked because the reflection density of the carbon black itself is enhanced. From the above points of view, the average particle diameter of the self-dispersing anionic carbon black used in the present invention is most preferably at least 90 nm in that the effect due to the addition of the salt is achieved to the maximum.

The average particle diameter of the self-dispersing anionic carbon black in the present invention is defined as follows. The average particle diameter is expressed as a cumulant mean found on the basis of the principle of the dynamic light scattering method. In order to measure this average particle diameter, the measurement can be easily conducted by using a commercially available apparatus, for example, ELS-800 (trade name, manufactured by Ohtsuka Denshi K.K.).

The ink according to the present invention is provided as an ink having excellent properties that image quality does not undergo a great change depending on the kind of the recording medium used (particularly, irrespective of the permeability to ink of the. recording medium), and high-quality images can be stably formed by using self-dispersing anionic carbon black having such a specific value as describe above as to functional-group density on the surface thereof as a colorant and causing such a salt as described above to coexist therewith. The detailed mechanism by which such an ink comes to exhibit such properties as described above has not been clarified up to the present. However, with respect to the Ka value determined by the Bristow method known as a measure indicating the penetrability of an ink into recording media, the present inventors have found that the ink according to the present invention exhibits a great Ka value compared with an ink having the same composition except that no salt is added. The increase in Ka value indicates that the penetrability of the ink into recording media has been improved. It has heretofore been the common sense of those skilled in the art that the improvement in the penetrability of an ink means the lowering of image density. More specifically, the those skilled in the art have heretofore recognized that the colorant also deeply penetrates into a recording medium together with the ink, and consequently the optical density of an image formed Is lowered. Judging from this recognition, the ink according to the present invention, which exhibits a great Ka value compared with an ink having the same composition except that no salt is added, will result in a failure to provide any image high in density and quality.

Synthetically judging from the various findings as to the ink, the specific salt contained in such ink is considered to cause such a special action that separation between the solvent and solids in the ink (solid-liquid separation) after it is applied to a recording medium extremely rapidly occurs. More specifically, if the solid-liquid separation upon the application of the ink to the recording medium is slow, it is foreseen that the ink isotropically diffuses in the recording medium together with the coloring material when the ink has a great Ka value or the recording medium has high permeability to ink, so that the sharpness of characters (character quality) is impaired, and moreover the image density is also lowered due to the penetration of the ink up to the deep interior of the recording medium. In the ink according to the present invention, however, such a phenomenon is not observed. It is therefore considered that the solid-liquid separation of the ink rapidly occurs, and consequently high-quality images can be formed with high image density and color developing property in spite of the increase of Ka value of the ink. The reason why the deterioration of character quality and the lowering of image density hardly occur in the ink according to the present invention even when the recording medium has comparatively high permeability is considered to be the same as described above.

Regarding this, further description is given with reference to FIGS. 10A to 10C and FIGS. 11A to 11C.

FIGS. 10A to 10C and FIGS. 11A to 11C typically and conceptually illustrate a state of solid-liquid separation occurred when an Ink containing the specific salt and an ink containing no such salt have been respectively ejected from an orifice by an ink-jet recording system to apply them to a recording medium having high permeability.

Figure 10A:
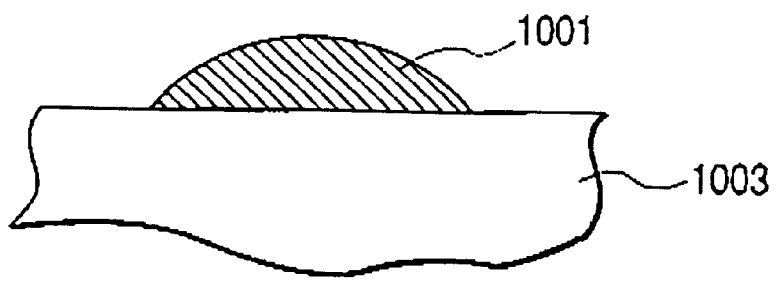
FIGS. 10A, 10B and 10C schematically illustrate a process of solid-liquid separation at the time a salt-containing pigment ink has been applied to a recording medium.
Figure 10B:
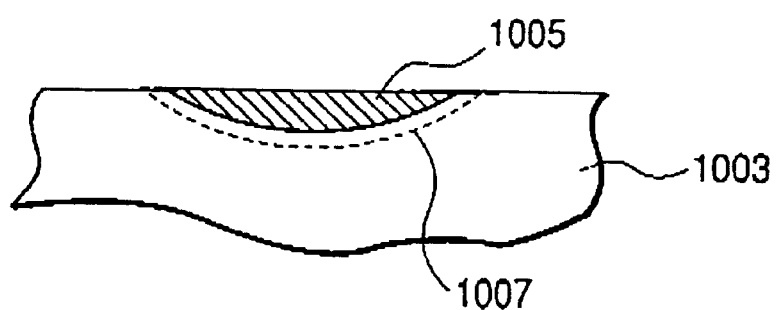
Figure 11A:
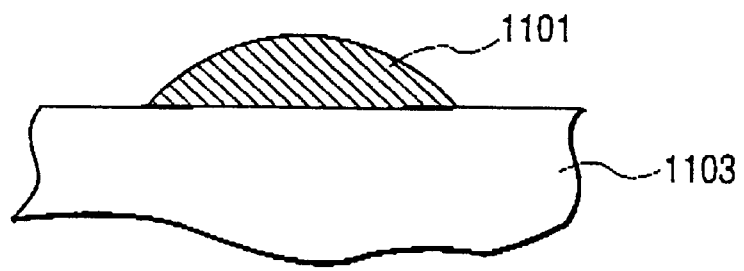
FIGS. 11A, 11B and 11C schematically illustrate a process of solid-liquid separation at the time a pigment ink containing no salt has been applied to a recording medium.
Figure 11B:
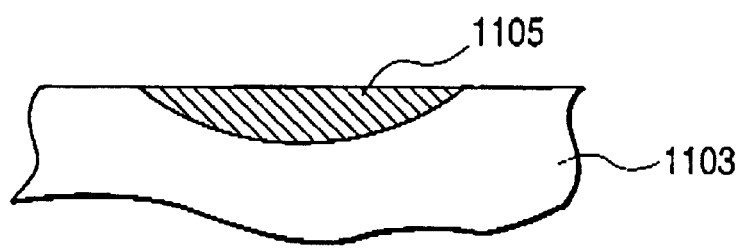

More specifically, right after the inks have been attached on the recording medium, both inks are in a state that the ink 1001 or 1101 has been put on the surface of the recording medium irrespective of the addition of the salt as illustrated in FIGS. 10A and 11A. After the time T1 has elapsed, the ink 1001, to which the salt has been added, quickly undergoes solid-liquid separation to separate the ink into a region 1005 containing almost all the solid components in the ink and a liquid medium in the ink as illustrated in FIG. 10B, and a penetration lead 1007 of the separated liquid medium proceeds to the interior of a recording medium 1003. On the other hand, in the ink 1101 to which no salt has been added, the ink penetrates into the interior of a recording medium 1103 in a state 1105 undergoing no solid-liquid separation because the solid-liquid separation does not occur to the same extent as the ink, to which the salt has been added, as illustrated in FIG. 11B.

Figure 10C:
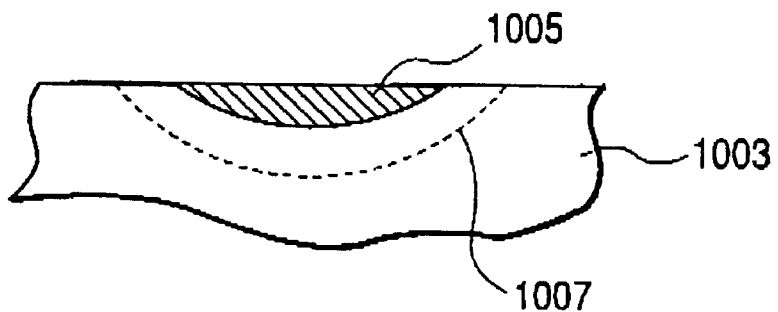
Figure 11C:
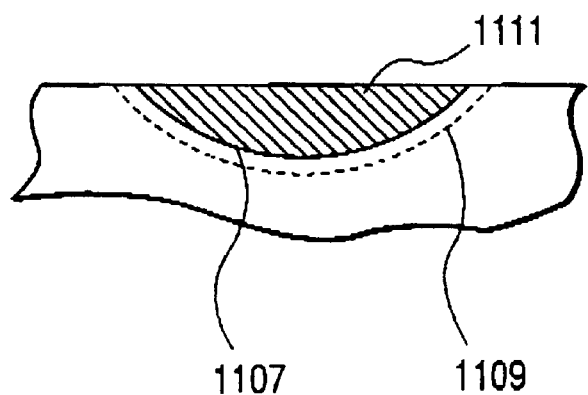

After the time T2 has elapsed, in the ink 1001 to which the salt has been added, the penetration lead 1007 of the liquid medium further proceeds to the interior of the recording medium 1003, while the region 1005 is retained as it remains on the surface of the recording medium and in the vicinity thereof as illustrated in FIG. 10C. On the other hand, in the ink 1101 to which no salt has been added, solid-liquid separation starts at this point of time as illustrated in FIG. 11C, and a difference is made between a penetration lead 1107 of the solids in the ink and a penetration lead 1109 of the liquid medium. However, a solid-containing region 1111 in the ink has already reached a deep part of the recording medium. Incidentally, the times T1 and T2 in the above description are represented as a standard for conceptually grasping a difference in solid-liquid separation between the presence and absence of the salt.

As apparent from the above description, the solid-liquid separation in the ink rapidly takes place on the surface of the recording medium due to the addition of the specific salt to the ink. Therefore, the solid-liquid separation starts at a relatively early stage after the ink lands on the recording medium, so that the pigment and the like remain on the surface of the recording medium, and the liquid medium and the like penetrate into the interior of the recording medium. It is thus considered that the above-described effects are brought about. Namely, it is considered that the image density and quality of an image formed become hard to be affected by the degree of permeability of the recording medium, and the like since the specific salt is added. Among the above-described specific salts, benzoates (for example, ammonium benzoate, etc.) are compatible with the self-dispersing carbon black as described above, more specifically, far excellent in the solid-liquid separating effect when the ink is applied to a recording medium. As a result, the ink containing such salt permits the formation of images having far excellent quality on various recording media.

Another effect by the addition of the salt in the inks includes improvement in intermittent ejection stability of the ink. The intermittent ejection stability is evaluated in the following manner. Namely, attention is paid to a predetermined nozzle in a recording head. Once an ink is ejected from this nozzle, the nozzle is left to stand for a predetermined period of time without conducting preliminary ejection of the ink or suction of the ink into the nozzle, and the ink Is then ejected again from the nozzle. The ink is thus evaluated as to whether the ink is normally ejected from the beginning of the resumption of ejection or not.

According to an investigation by the present inventors, it has been found that the above-mentioned various excellent effects are most effectively achieved when the above-described salt is contained within a range of from 0.05 to 10 by weight, particularly from 0.1 to 5% by weight based on the total weight of the ink. The content of the self-dispersing carbon black contained as a colorant is preferably within a range of from 0.1 to 15% by weight based on the total weight of the ink. The contents of the self-dispersing carbon black and salt in the inks are both controlled within the above respective ranges, whereby far excellent effects can be achieved.

(Medium)

The medium of the inks will hereinafter be described. The inks comprise the above-described self-dispersing carbon black and salt. These components are generally dissolved or dispersed in an aqueous medium to prepare a water-based ink. Examples of the aqueous medium include water and mixed solvents of water and a water-soluble organic solvent. In the present invention, a mixed solvent of water and a water-soluble organic solvent is preferably used As the water-soluble organic solvent, is particularly preferred a solvent having an effect of preventing the drying of inks.

Specific examples of the water-soluble organic solvent include alkyl alcohols having 1 to 4 carbon atoms, such as methyl alcohol, ethyl alcohol, n-propyl alcohol, isopropyl alcohol, n-butyl alcohol, sec-butyl alcohol and tert-butyl alcohol; amides such as dimethylformamide and dimethylacetamide; ketones and ketone alcohols such as acetone, methyl ethyl ketone, methyl isobutyl ketone and diacetone alcohol; ethers such as tetrahydrofuran and dioxane; polyalkylene glycols such as polyethylene glycol and polypropylene glycol; polyols the alkylene moiety of which has 2 to 6 carbon atoms, such as ethylene glycol, propylene glycol, butylene glycol, triethylene glycol, 1,2,6-hexanetriol, thiodiglycol, hexylene glycol and diethylene glycol; lower alkyl ether acetates such as polyethylene glycol monomethyl ether acetate; glycerol; lower alkyl ethers of polyhydric alcohols, such as ethylene glycol monomethyl (or monoethyl) ether, diethylene glycol methyl (or ethyl) ether and triethylene glycol monomethyl (or monoethyl) ether; polyhydric alcohols such as trimethylolpropane and trimethylolethane; N-methyl-2-pyrrolidone; 2-pyrrolidone; and 1,3-dimethyl-2-imidizolidinone. The water-soluble organic solvents mentioned above may be used either singly or in any combination thereof. With respect to the water, it is desirable to use deionized water.

No particular limitation is imposed on the content of the water-soluble organic solvent contained in the inks. However, it is preferably within a range of from 3 to 50% by weight based on the total weight of the ink. On the other hand, the content of water contained in the inks is preferably within a range of from 50 to 95% by weight based on the total weight of the ink.

The inks may be used as inks for writing utensils and particularly inks for ink-jet recording. Ink-jet recording methods include a recording method in which mechanical energy is applied to an ink to eject droplets of the ink, and a recording method in which thermal energy is applied to an ink to eject droplets of the ink by bubbling of the ink. The inks are suitable for use in these recording methods.

When the inks are used in ink-jet recording, the inks preferably have such properties as they can be ejected from an ink-jet recording head. From the viewpoint of ejection from the ink-jet recording head, the inks are preferably controlled so as to have, as their own physical properties, a viscosity of 1 to 15 cP, particularly 1 to 5 cP and a surface tension of 25 mN/m (dyn/cm) or higher, particularly 25 to 50 mN/m (dyn/cm).

An index indicating the penetrability of an ink into a recording medium includes a Ka value determined by the Bristow method. The inks are preferably prepared in such a manner that this Ka value indicates a specified value. More specifically, the penetrating amount V ($mL/m^2=\mu m$) of ink into a recording medium after the lapse of a predetermined time t from the ejection of an ink droplet is expressed in terms of the Bristow's formula:

$$V=Vr+Ka(t-tw)^{1/2}$$

supposing that the penetrability of the ink is expressed by an ink amount V per $m^2$, tw is a contact or wet time and Vr is an amount of ink absorbed.

Here, directly after the ink droplet is deposited onto the surface of the recording medium, almost all the ink is absorbed in irregularities (rough portions on the surface of the recording medium) in the surface and almost none penetrates into the interior of the recording medium. The time during that is a contact or wet time (tw), and the amount of ink absorbed in the irregularities during the wet time is Vr. When the contact time elapsed after the depositing of ink, the amount of ink penetrating through a recording medium increases in proportion to one half (½) power of the elapsed time exceeding the contact time, i.e, (t−tw). Ka is a proportionality factor of this increment and represents a value in accordance with the penetration velocity. The Ka value may be determined by means of a dynamic penetrability tester (for example, Dynamic Penetrability Tester S, trade name, manufactured by Toyo Seiki Seisaku-Sho, Ltd.) for liquid based on the Bristow method.

It is preferred from the viewpoint of further improving the quality of recorded images that the inks be prepared in such a manner that this Ka value is lower than 1.5. It is more preferred that the inks be prepared in such a manner that the Ka value is not lower than 0.2, but lower than 1.5. Namely, when the Ka value is lower than 1.5, the ink undergoes the solid-liquid separation at an earlier stage of the penetration of the ink into a recording medium, so that a high-quality image extremely little in feathering can-be formed.

The Ka value by the Bristow method is a value measured by using, as recording media, plain paper (for example, PB paper used for both copying machines and page printers (laser beam printers) using an electrophotographic system manufactured by Canon Inc., and printers using an ink-jet recording system, and PPC paper which is paper for copying machines using an electrophotographic system). As measuring environments, ordinal office environments, for example, temperature of 20 to 25° C., and humidity of 40 to 60% are assumed.

Examples of preferable compositions of aqueous media by which such properties as described above can be imparted to the inks according to the present invention include those comprising glycerol, trimethylolpropane, thiodiglycol, ethylene glycol, diethylene glycol, isopropyl alcohol and acetylene alcohol among those mentioned above. In particular, when the Ka value is controlled to lower than 1.5 as described above, a surfactant such as an ethylene oxide adduct of acetylene glycol ("Acetylenol", trade name, product of Kawaken Fine Chemicals Co., Ltd.), penetrable solvent and the like may be preferably added in respective prescribed amounts.

In order to provide an ink having desired physical properties, a surfactant, an antifoaming agent, an antiseptic, a mildew proofing agent, a pH adjuster, an antioxidant and the like may be added to the ink in addition to the above-described components, as needed. Further, a commercially-available water-soluble dye may also be added for the purpose of adjusting the color tone of the ink.

(Ink Set)

The ink set according to the present invention will hereinafter be described. The ink set comprises in combination the ink (black ink) according to the present invention having the constitution described above and a water-based color Ink comprising at least one coloring material selected from among coloring materials for cyan, magenta, yellow, red, green and blue. More specifically, the ink set according to the present invention can be provided as an ink set suitably usable in the formation of color images by combining the black ink according to the present invention with at least one color ink selected from among a color Ink comprising a coloring material for yellow, a color ink comprising a coloring material for magenta, a color Ink comprising a coloring material for cyan, a color ink comprising a coloring material for blue and a color ink comprising a coloring material for green. When such an ink set is used to conduct such recording that a black-image portion and a color-image portion adjoin each other, the bleeding at boundary regions between an image formed by the ink comprising carbon black according to the present invention and an image formed by the ink comprising another coloring material can be extremely effectively prevented from occurring.

The reason why such an ink set can effectively prevent the bleeding is not clearly known. However, it is considered that the speed of solid-liquid separation of the ink on the recording medium surface participates in. The solid-liquid separation after the black ink is deposited to a recording medium as the effect arising from causing the self-dispersing carbon black to coexist with the salt in the black ink of the present invention, and subsequent solidification of the coloring material quickly occurs, so that the black ink becomes hard to bleed into the color-ink side at the boundary portion in the color image.

As a colorant used in preparing a color ink when an ink set is prepared by combining it with the ink according to the present invention, such known dyes and pigments as mentioned below may be used. The content of the colorant contained in other inks is preferably within a range of from 0.1 to 15% by weight, particularly, from 1 to 10% by weight based on the total weight of the ink.

As dyes contained in other inks may be used conventionally known dyes, for example, acid dyes, reactive dyes, direct dyes, food colors, etc. As anionic dyes, most of both dyes already known and newly synthesized may be used so far as they can provide images having proper color tone and density when the images are formed thereby. Some of them may also by used in combination.

As specific examples of the anionic dyes usable in other inks, may be mentioned the following dyes:

(Coloring Material for Yellow)

C.I. Direct Yellow 8, 11, 12, 27, 28, 33, 39, 44, 50, 58, 85, 86, 87, 88, 89, 98, 100, 110 and 132;

C.I. Acid Yellow 1, 3, 7, 11, 17, 23, 25, 29, 36, 38, 40, 42, 44, 76, 98 and 99;

C.I. Reactive Yellow 2, 3, 17, 25, 37 and 42; and

C.I. Food Yellow 3.

(Coloring Material for Red)

C.I. Direct Red 2, 4, 9, 11, 20, 23, 24, ,31, 39, 46, 62, 75, 79, 80, 83, 89, 95, 197, 201, 218, 220, 224, 225, 226, 227, 228, 229 and 230;

C.I. Acid Red 6, 8, 9, 13, 14, 18, 26, 27, 32, 35, 42, 51, 52, 80, 83, 87, 89, 92, 106, 114, 115, 133, 134, 145, 158, 198, 249, 265 and 289;

C.I. Reactive Red 7, 12, 13, 15, 17, 20, 23, 24, 31, 42, 45, 46 and 59; and

C.I. Food Red 87, 92 and 94.

(Coloring Material for Blue)

C.I. Direct Blue 1, 15, 22, 25, 41, 76, 77, 80, 86, 90, 98, 106, 108, 120, 158, 163, 168, 199 and 226;

C.I. Acid Blue 1, 7, 9, 15, 22, 23, 25, 29, 40, 43, 59, 62, 74, 78, 80, 90, 100, 102, 104, 117, 127, 138, 158 and 161; and C.I. Reactive Blue 4, 5, 7, 13, 14, 15, 18, 19, 21, 26, 27, 29, 32, 38, 40, 44 and 100.

(Coloring Material for Black)

C.I. Direct Black 17, 19, 22, 31, 32, 51, 62, 71, 74, 112, 113, 154, 168 and 195;

C.I. Acid Black 2, 48, 51, 52, 110, 115 and 156; and

C.I. Food Black 1 and 2.

Examples of solvents or dispersion media used in preparing the color inks include water and mixed solvents of water and a water-soluble organic solvent. As the water-soluble organic solvent, may be used the same solvents as those used in the inks according to the present invention. When such color inks are applied to a recording medium by an ink-jet recording method (for example, bubble-jet method), it is preferred that the color inks be controlled so as to have the above desired viscosity and surface tension in order for the color inks to exhibit excellent ink-jet ejection properties like the inks according to the present invention.

The content of the water-soluble organic solvent in each of the color inks may be suitably selected in such a manner that such ink has excellent ink-jet ejection properties and the desired color tone and density when it is used in, for example, ink-jet recording. For example, as a standard, it is preferably within a range of from 3 to 50% by weight based on the total weight of the ink. The amount of water contained in the ink is preferably within a range of from 50 to 95% by weight based on the total weight of the ink.

With respect to the color inks, it is preferred that the respective inks be prepared in such a manner that the Ka value determined by the Bristow method known as a measure indicating the penetrability of an ink into recording media is, for example, at least 5 because highest-quality images can be formed on a recording medium when they are used in combination with the black ink according to the present invention. More specifically, since an ink having such a Ka value has high penetrability into a recording medium, the occurrence of color bleeding between adjacent images can be prevented even when images of at least two colors selected from among, for example, yellow, magenta and cyan are formed adjoiningly. In addition, even when these inks are ejected so as to overlap with each other to form an image of a secondary color, the occurrence of bleeding between the adjacent images of different colors can be effectively alleviated because the penetrability of these inks is high. As a method for adjusting the Ka value of the color inks to such a value, may be applied the conventionally known method such as addition of a surfactant to the ink, or addition of a penetrable solvent such as glycol ether. It goes without saying that the amount of these materials added may be suitably controlled in good balance with the Ka value.

Ink-jet recording techniques in which the ink or ink sets according to the present invention can be suitably used will hereinafter be described. An exemplary construction of a head, which is a main part of an ink-jet recording apparatus making good use of thermal energy in ejecting the ink is shown in FIGS. 1 and 2.

Figure 2:
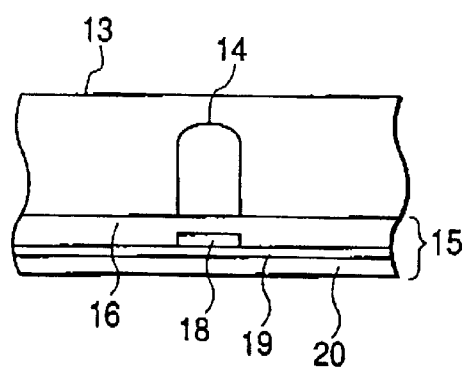
FIG. 2 is a transverse cross-sectional view taken along line 2—2 in FIG. 1.

FIG. 1 is a cross-sectional view of a head 13 taken along the flow path of ink, and FIG. 2 is a cross-sectional view taken along line 2—2 in FIG. 1. The head 13 is formed by bonding a glass, ceramic, silicon or plastic plate or the like having a flow path (nozzle) 14 through which an ink is passed, to a heating substrate 15. The heating substrate 15 is composed of a protective layer 16 made of silicon oxide, silicon nitride, silicon carbide or the like, electrodes 17-1 and 17-2 formed of aluminum, gold, aluminum-copper alloy or the like, a heating resistor layer 18 formed of a high-melting material such as, $HfB_2$, TaN or TaAl, a heat accumulating layer 19 formed of silicon oxide, aluminum oxide or the like, and a substrate 20 made of silicon, aluminum, aluminum nitride or the like having a good heat radiating property.

Now, upon application of pulsed electric signals to the electrodes 17-1 and 17-2 of the head 13, the heating substrate 15 rapidly generates heat at the region shown by "n" to form a bubble in an ink 21 which is in contact with this region. A meniscus 23 of the ink is projected by the pressure thus produced, and the ink 21 is ejected from an ejection opening 22 as ink droplets 24 through the nozzle 14 of the head 13 toward a recording medium 25.

Figure 3:
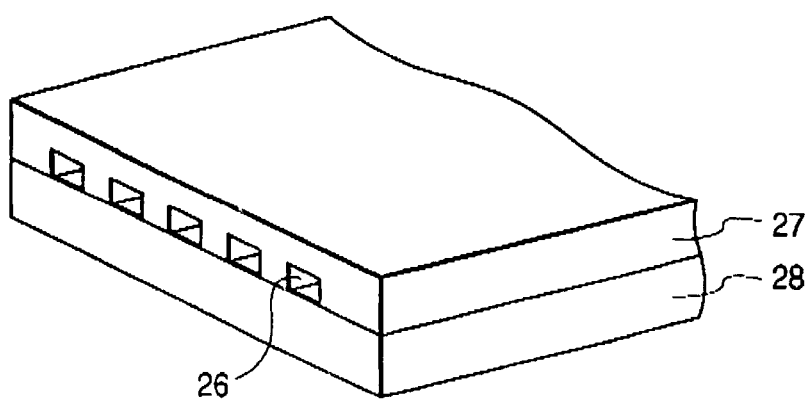
FIG. 3 schematically illustrates a multi-head.

FIG. 3 illustrates an appearance of a multi-head composed of an array of a number of heads as shown in FIG. 1. The multi-head is formed by closely bonding a glass plate 27 having a number of grooves 26 to a heating head 28 similar to that described in FIG. 1.

Figure 4:
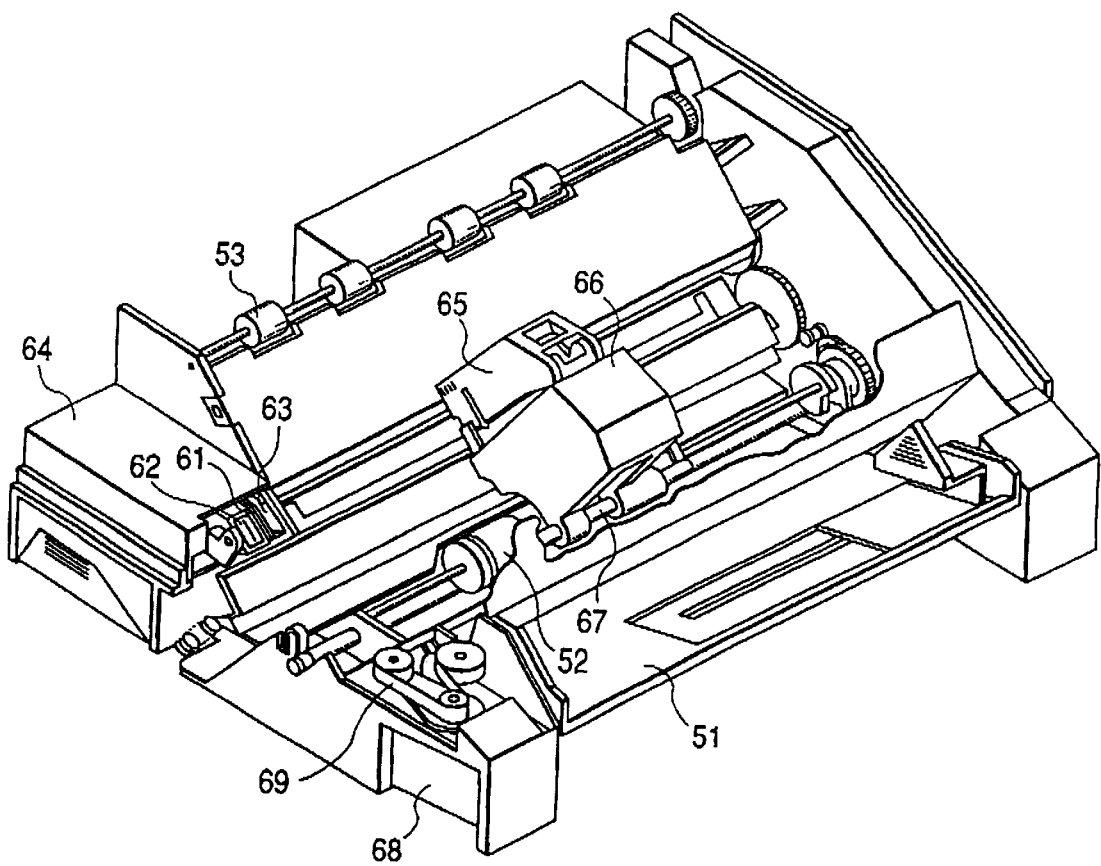
FIG. 4. is a schematic perspective view illustrating an ink-jet recording apparatus according to an embodiment.

FIG. 4 illustrates an example of an ink-jet recording apparatus in which such a head 13 as described above has been incorporated. In FIG. 4, reference numeral 61 designates a blade serving as a wiping member, one end of which is a stationary end held by a blade-holding member to form a cantilever The blade 61 is provided at a position adjacent to a region in which a recording head 65 operates, and in this embodiment, is held in such a form that it protrudes into the course through which the recording head 65 is moved.

Reference numeral 62 indicates a cap for the face of ejection openings of the recording head 65, which is disposed at a home position adjacent to the blade 61, and is so constructed that it moves in a direction perpendicular to the direction in which the recording head 65 is moved, and comes into contact with the face of the ejection openings to cap it. Reference numeral 63 denotes an ink absorbing member provided adjoiningly to the blade 61 and, similar to the blade 61, held in such a form that it protrudes into the course through which the recording head 65 is moved. The above-described blade 61, cap 62 and ink absorbing member 63 constitute an ejection-recovery portion 64, where the blade 61 and ink absorbing member 63 remove water, dust and/or the like from the face of the ink-ejecting openings.

The recording head 65 has an ejection-energy-generating means and serves to eject the ink onto a recording medium set in an opposing relation to the ejection opening face provided with the ejection openings to conduct recording. Reference numeral 66 indicates a carriage on which the recording head 65 is mounted so that the recording head 65 can be moved. The carriage 66 is slidably interlocked with a guide shaft 67 and is connected (not illustrated) at its part to a belt 69 driven by a motor 68. Thus, the carriage 66 can be moved along the guide shaft 67 and hence, the recording head 65 can be moved from a recording region to a region adjacent thereto. Reference numerals 51 and 52 denote a paper feeding part from which the recording medium is inserted, and feed rollers driven by a motor (not illustrated), respectively With such a construction, the recording medium is fed to the position opposite to the ejection opening face of the recording head 65 and discharged from a discharge section provided with discharge rollers 53 with the progress of recording. In the above construction, the cap 62 in the ejection-recovery portion 64 is receded from the path of motion of the recording head 65 when the recording head 65 is returned to its home position after the completion of recording, and the blade 61 remains protruded into the path of motion. As a result, the ejection opening face of the recording head 65 is wiped.

When the cap 62 comes into contact with the ejection opening face of the recording head 65 to cap it, the cap 62 is moved so as to protrude into the path of motion of the recording head 65. When the recording head 65 is moved from its home position to the position at which recording is started, the cap 62 and the blade. 61 are at the same positions as the positions for the wiping as described above. As a result, the ejection opening face of the recording head 65 is also wiped at the time of this movement.

The above movement of the recording head 65 to its home position is made not only when the recording is completed or the recording head 65 is recovered for ejection, but also when the recording head 65 is moved between recording regions for the purpose of recording, during which it is moved to the home position adjacent to each recording region at given intervals, where the ejection opening face is wiped in accordance with this movement.

Figure 5:
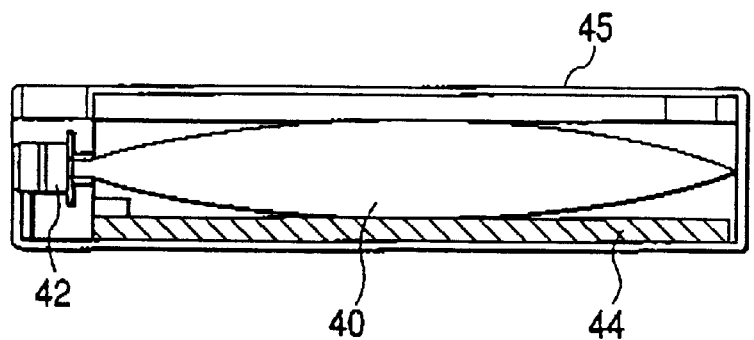
FIG. 5 is a longitudinal cross-sectional view of an ink cartridge according to an embodiment.

FIG. 5 illustrates an exemplary ink cartridge 45 in which an ink to be fed to a recording head through a member for feeding the ink, for example, a tube is contained. Here, reference numeral 40 designates an ink container portion containing the ink to be fed, as exemplified by a bag for ink. One end thereof is provided with a stopper 42 made of rubber. A needle (not illustrated) may be inserted into this stopper 42 so that the ink in the bag 40 for ink can be fed to the head. Reference numeral 44 indicates an absorbing member for receiving a waste ink. It is preferred that the ink container portion 40 be formed of a polyolefin, in particular, polyethylene, at its surface with which the ink comes into contact.

Figure 6:
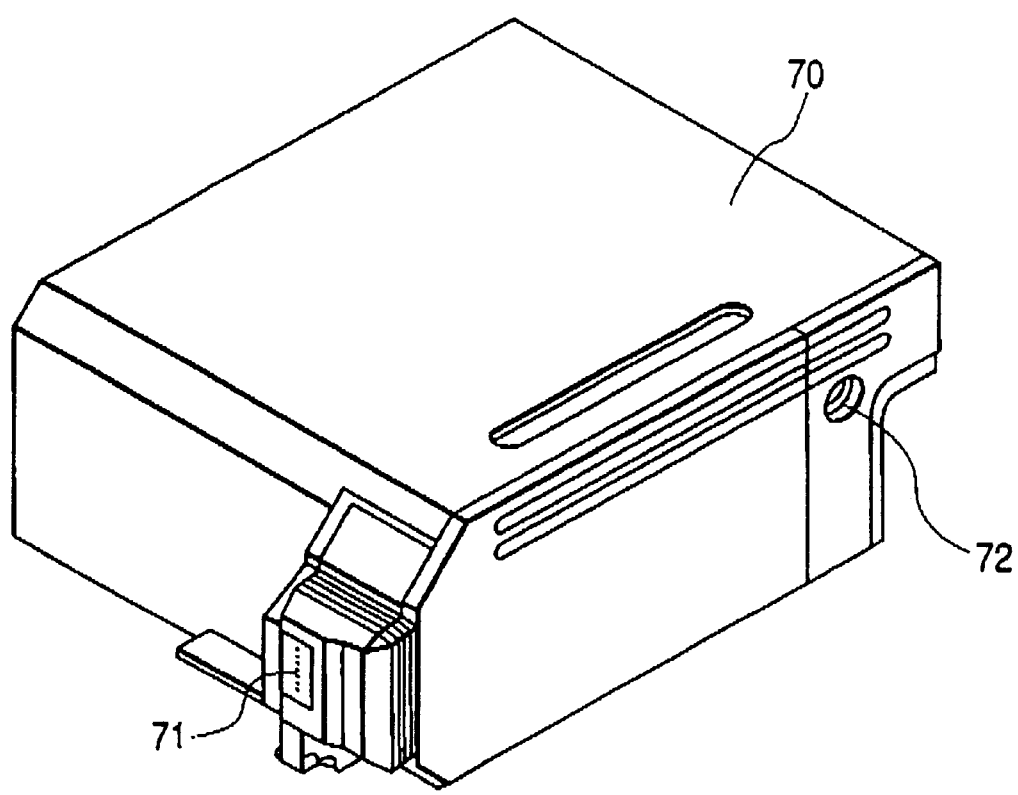
FIG. 6 is a perspective view illustrating an exemplary recording unit.

The ink-jet recording apparatus, in which the ink or ink set according to the present invention may be suitably used, are not limited to the apparatus as described above in which the head and the cartridge are separately provided. A device in which these members are integrally formed as shown in FIG. 6 can also be preferably used. In FIG. 6, reference numeral 70 designates a recording unit, in the interior of which an ink container portion containing an ink, for example, an ink absorbing member, is contained. The recording unit 70 is so constructed that the ink in such an ink absorbing member is ejected in the form of ink droplets through a head 71 having a plurality of orifices In the present invention, polyurethane is preferably used as a material for the ink absorbing member.

The ink container portion may be constructed without using the ink absorbing member by a bag for ink in the interior of which a spring or the like is provided. Reference numeral 72 indicates an air passage for communicating the interior of the recording unit 70 with the atmosphere. This recording unit 70 is used in place of the recording head 65 shown in FIG. 4, and is detachably installed on the carriage 66.

As a form of the ink-jet recording apparatus making good use of mechanical energy, may be mentioned an On-Demand type ink-jet recording head comprising a nozzle-forming substrate having a plurality of nozzles, a pressure-generating device composed of a piezoelectric material and an electrically conductive material provided in an opposing relation to the nozzles, and an ink filled around the pressure-generating devices, wherein the pressure-generating devices are displaced by voltage applied to eject droplets of the ink from the nozzles. An example of the construction of a recording head, which is a main component of such a recording apparatus, is illustrated in FIG. 7.

The head is composed of an ink flow path 80 communicating with an ink chamber (not illustrated), an orifice plate 81 through which ink droplets having a desired volume are ejected, a vibration plate 82 for directly applying a pressure to the ink, a piezoelectric element 83 bonded to the vibration plate 82 and undergoing a displacement in accordance with an electric signal, and a substrate 84 adapted to support and fix the orifice plate 81, the vibration plate 82 and the like thereon.

Figure 7:
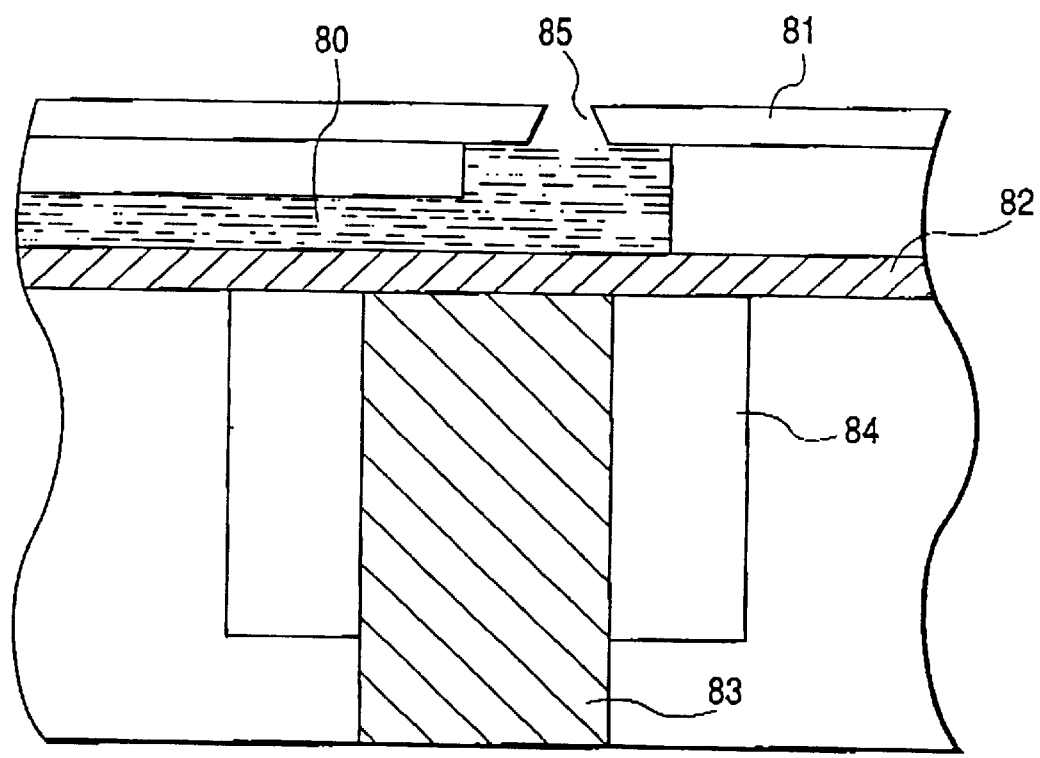
FIG. 7 is a schematic perspective view illustrating another exemplary construction of an ink-jet recording head.

In FIG. 7, the ink flow path 80 is formed with a photosensitive resin or the like. The orifice plate 81 is made of a metal such as stainless steel or nickel, and is provided with an ejection opening 85 which is formed by electroforming, punching by press working, or the like. The vibration plate 82 is formed with a film of a metal such as stainless steel, nickel or titanium and a high-modulus resin film or the like. The piezoelectric element 83 is made of a dielectric material such as barium titanate or PZT.

The recording head with the above construction is operated in such a manner that pulsed voltage is applied to the piezoelectric element 83 to generate a strain stress, the vibration plate 82 bonded to the piezoelectric element 83 is deformed by the energy of the stress, and the ink in the ink flow path 80 is thus perpendicularly pressurized to eject ink droplets (not illustrated) from the ejection opening 85 of the orifice plate 81, thereby conducting recording. Such a recording head is used by incorporating it into an ink-jet recording apparatus similar to that illustrated in FIG. 4. Operation of details of the ink-jet recording apparatus may be conducted in the same manner as described above.

Figure 9:
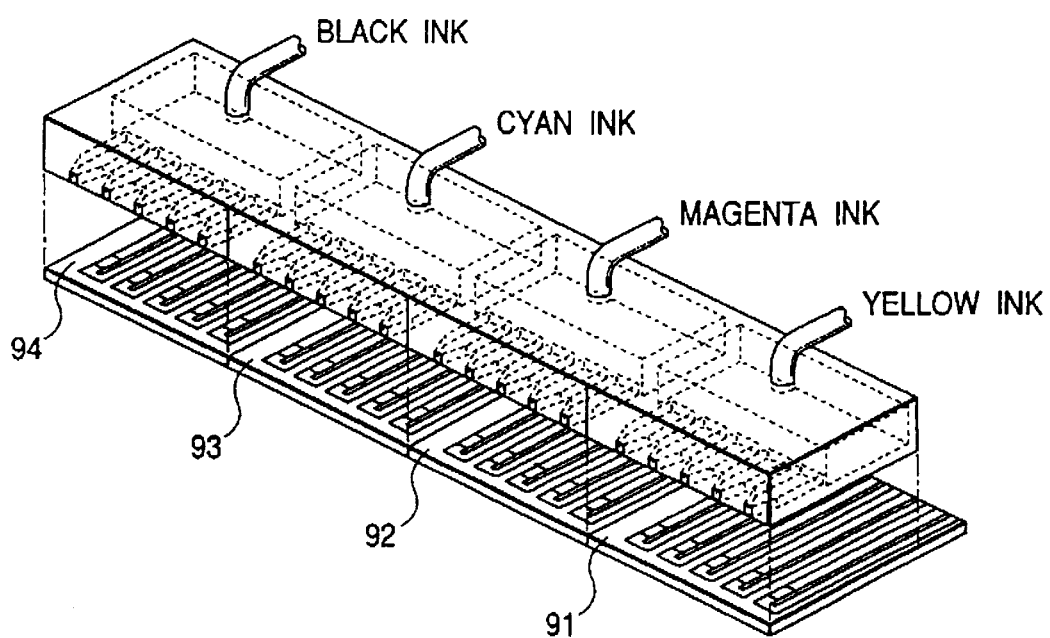
FIG. 9 schematically illustrates the construction that 4 recording heads are arranged on a carriage.

When an ink set according to the present invention is used to record color images, for example, a recording apparatus can be used in which, for example, recording heads, each of which has been illustrated in FIG. 3, are arranged on a carriage. An embodiment thereof is illustrated in FIG. 9. Reference characters 91, 92, 93 and 94 indicate recording units for ejecting inks of yellow, magenta, cyan and black colors, respectively. The recording units are arranged on the carriage of the above-described recording apparatus and serve to eject the respective color inks according to recording signals.

Figure 8:
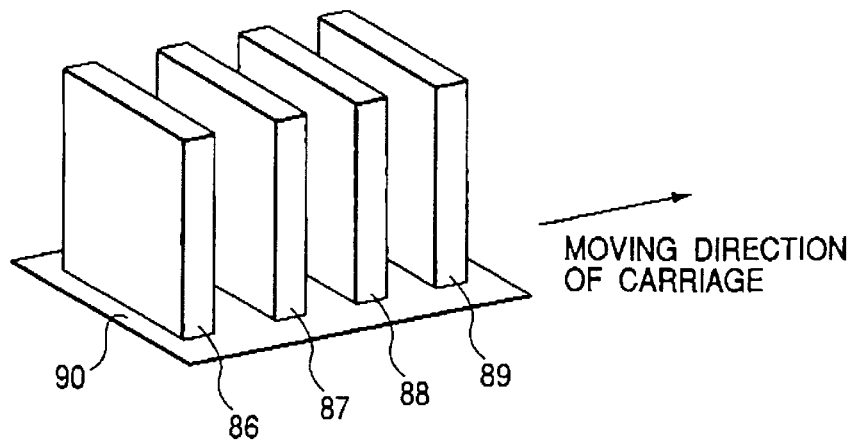
FIG. 8 schematically illustrates a recording head in which 4 ink cartridges are installed.

FIG. 9 shows the case where the four recording heads have been used. However, the present invention is not limited thereto. For example, ink cartridges 86 to 89 respectively containing the above four colors ink are set in a recording head 90 in which ink flow paths are separately formed in such a manner that the color inks fed from the ink cartridges 86 to 89 can be separately ejected by one recording head as shown in FIG. 8, thereby conducting recording.

Figure 14:
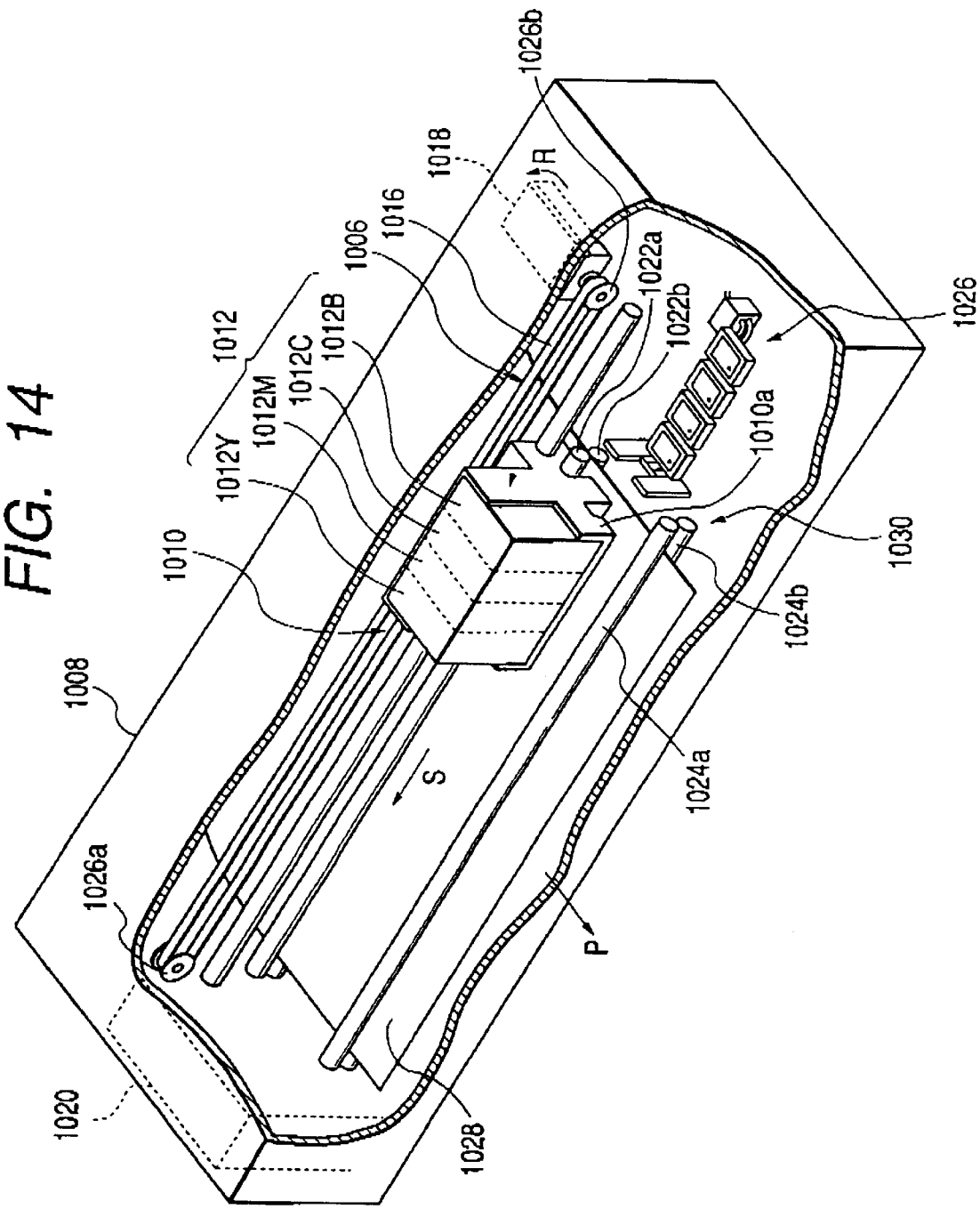
FIG. 14 is a schematic perspective view illustrating principal parts in an exemplary ink-jet printer capable of installing a liquid-ejecting head.

Other specific examples of the recording apparatus and recording heads preferably used in the present invention will hereinafter be described. FIG. 14 is a schematic perspective view illustrating principal parts of a liquid-ejecting head of an ejection system in which a bubble communicates with the air upon ejection, and an exemplary ink-jet printer as a liquid-ejecting apparatus using this head.

In FIG. 14, the Ink-jet printer comprises a conveying device 1030 for intermittently conveying paper 1028 as a recording medium provided along the longitudinal direction in a casing 1008 in a direction shown by an arrow P in FIG. 14, a recording part 1010 reciprocatively moved in a direction substantially parallel to a direction S substantially perpendicular to the conveying direction P of the paper 1028 by the conveying device 1030, and a driving part 1006 as a driving means for reciprocatively moving the recording part 1010.

The driving part 1006 comprises a belt 1016 wound around pulleys 1026a and 1026b respectively provided on rotating shafts oppositely arranged at a prescribed interval and a motor 1018 for driving the belt 1016 joined to a carriage member 1010a of the recording part 1010 arranged in substantial parallel with roller units 1022a and 1022b in forward and reverse directions.

When the motor 1018 is operated to rotate the belt 1016 in a direction shown by an arrow R in FIG. 14, the carriage member 1010a of the recording part 1010 is moved by the prescribed movement in the direction shown by the arrow S in FIG. 14. When the motor 1018 is operated to rotate the belt 1016 in a direction reverse to the direction shown by the arrow R in FIG. 14, the carriage member 1010a of the recording part 1010 is moved by the prescribed movement in a direction reverse to the direction shown by the arrow S in FIG. 14. At an end of the driving part 1006, a recovery unit 1026 for conducting an ejection-recovery treatment for the recording part 1010 is provided opposite to an array of ink-ejection openings of the recording part 1010 at the home position of the carriage member 1010a.

In the recording part 1010, ink-jet cartridges (hereinafter also referred merely to as "cartridges" in some cases) 1012Y, 1012M, 1012C and 1012B for respective colors, for example, yellow, magenta, cyan and black, are detachably mounted on a carriage member 1010a.

Figure 15:
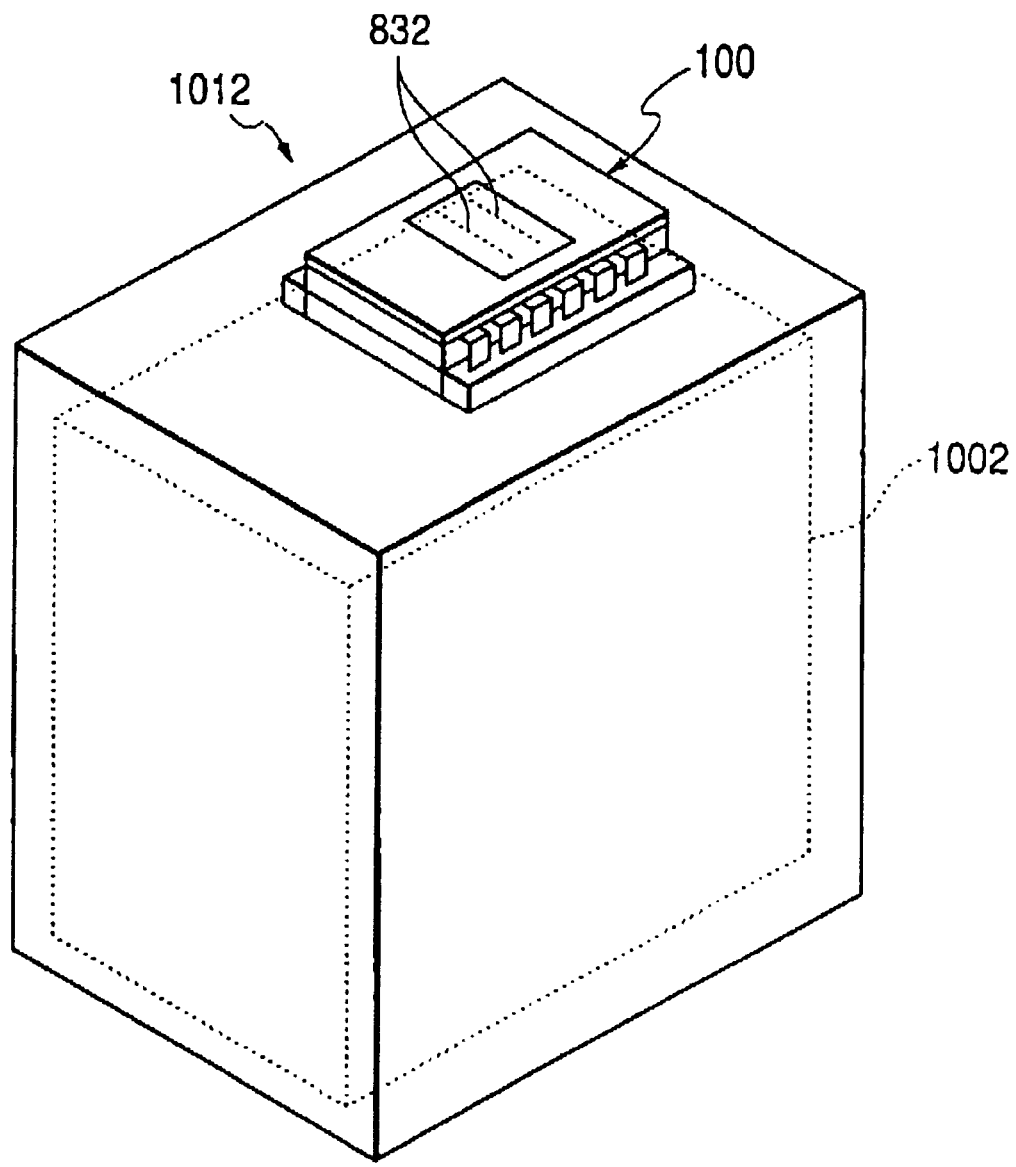
FIG. 15 is a schematic perspective view illustrating an exemplary ink-jet cartridge equipped with the liquid-ejecting head.

FIG. 15 illustrates an exemplary ink-jet cartridge capable of being mounted on the ink-jet recording apparatus. The cartridge 1012 in this embodiment is of a serial type, and its principal part is constructed by an ink-jet recording head 100 and a liquid tank 1002 for containing a liquid such as an ink.

In the ink-jet recording head 100, a great number of ejection openings 832 for ejecting the liquid are formed, and the liquid such as an ink is directed to a common liquid chamber (see FIG. 16) in the liquid-ejecting head 100 through a liquid feed passage (not illustrated) from the liquid tank 1002. The cartridge 1012 is so constructed that the ink-jet recording head 100 and the liquid tank 1002 are integrally formed, and the liquid can be supplied to the interior of the liquid tank 1002 as needed. However, a structure that the liquid tank 1002 is replaceably joined to this liquid-ejecting head 100 may also be adopted.

A specific example of the above-described liquid-ejecting head capable of being mounted on the ink-jet printer of such a construction will hereinafter be described in detail.

Figure 16:
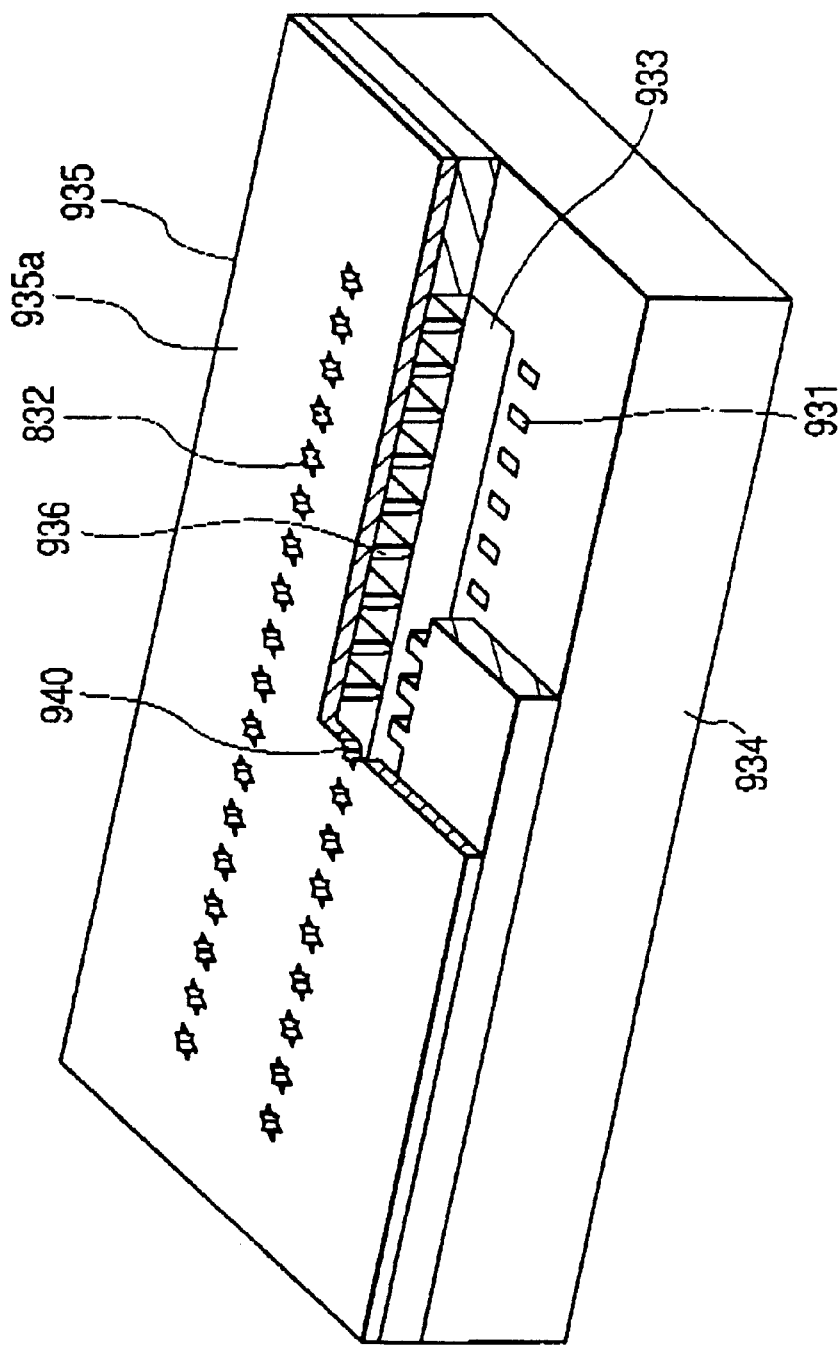
FIG. 16 is a schematic perspective view typically illustrating principal parts of an exemplary liquid-ejecting head.

FIG. 16 is a schematic perspective view typically illustrating principal parts of a liquid-ejecting head showing the basic form of the present Invention, and FIGS. 17 to 20 are front views illustrating the form of ejection openings of the liquid-ejecting head shown in FIG. 16. Electrical wiring and the like for driving electrothermal converters are omitted.

In the liquid-ejecting head according to this embodiment, such a substrate 934 composed of glass, ceramic, plastic or metal as illustrated in, for example, FIG. 16 is used The material of such a substrate is not essential to the present invention and is not particularly limited so far as it functions as a part of a flow-path forming member and as a support for an ink ejection-energy-generating element and a material layer for forming a liquid flow path and ejection openings which will be described later. Therefore, in this embodiment, the description is given in the case where an Si substrate (wafer) is used. The ejection openings can be formed in accordance with not only a forming process by laser beam, but also, for example, a process in which a photosensitive resin is used as an orifice plate (ejection-opening plate) 935, which will be described later, to form openings by means of an exposure device such as MPA (mirror projection aligner).

In FIG. 16, reference numeral 934 indicates a substrate equipped with electrothermal converters (hereinafter also referred to as "heater" in some cases) 931 and an ink feed opening 933 formed of a long-grooved through-opening as a common liquid chamber. The heaters 931, which are thermal energy-generating means, are arranged In a zigzag form in a row on both sides of the ink feed opening 933 along the longitudinal direction thereof with an interval of, for example, 300 dpi between the electrothermal converters. Ink passage walls 936 for forming ink flow paths are provided on the substrate 934. Further, an ejection-opening plate 935 equipped with ejection openings 832 is provided on the ink passage walls 936.

In FIG. 16, the ink passage walls 936 and the ejection-opening plate 935 are illustrated as separate members. However, the ink passage walls 936 may be formed on the substrate 934 by a method such as spin coating, thereby forming the ink passage walls 936 and the ejection-opening plate 935 as the same member at the same time. In this embodiment, the side of the ejection-opening face (upper surface) 935*a* is subjected to a water-repellent treatment.

In this embodiment, a serial type head is used to conduct recording at, for example, 1,200 dpi, in which recording is conducted while the head is scanned in the direction shown by the arrow S in FIG. 14. Driving frequency is 10 kHz, and ejection is conducted at the shortest time interval of 100 $\mu$s in one ejection opening.

Figure 17:
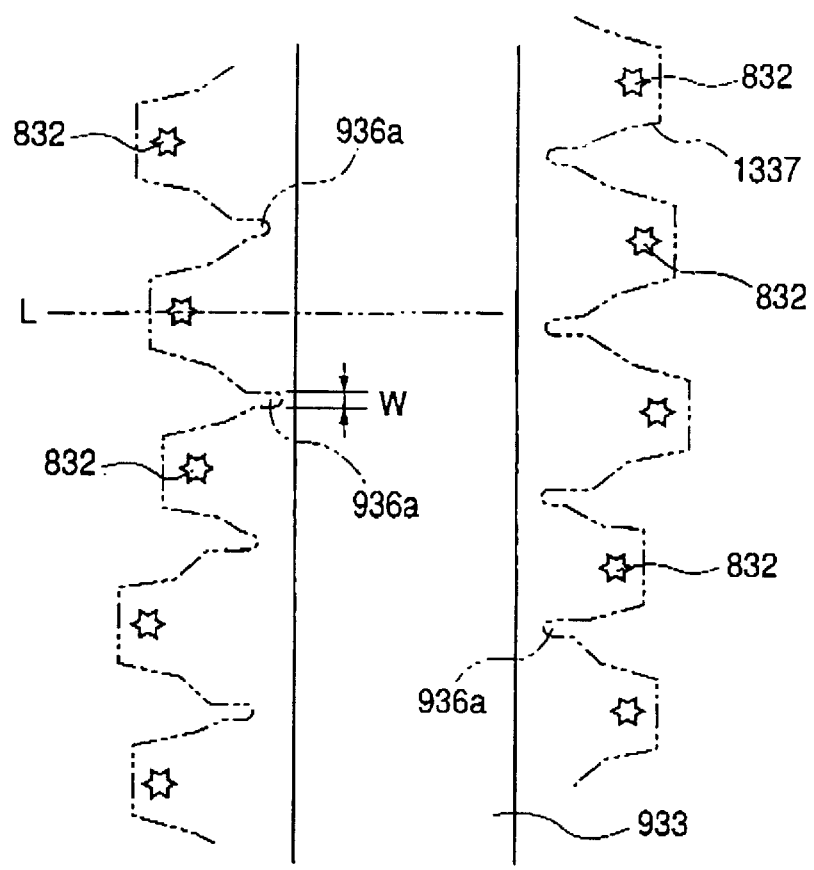
FIG. 17 is a conceptual view illustrating a part extracted from the exemplary liquid-ejecting head.
Figure 20:
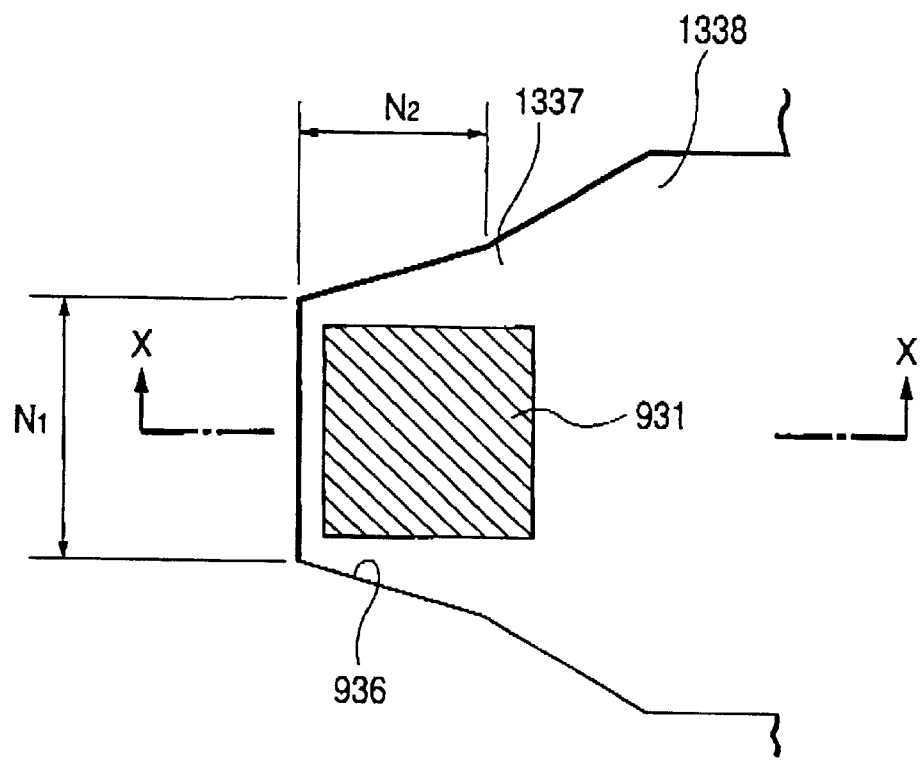
FIG. 20 typically illustrates a principal part in FIG. 17.

As an example of the dimensions of the head, a partition wall 936*a* for isolating adjacent nozzles from each other from the viewpoint of separating fluid has a width of 14 $\mu$m as illustrated in, for example, FIG. 17. As illustrated in FIG. 20, a bubbling chamber 1337 formed by the walls 936 for ink flow path has $N_1$ (width of the bubbling chamber) of 33 $\mu$m and $N_2$ (length of the bubbling chamber) of 35 $\mu$m. The size of the heater 931 is 30 $\mu$m, the resistance value of the heater is 53 Ω, and driving voltage is 10.3 V. A head in which the heights of the ink passage wall 936 and the partition wall 936*a* are 12 $\mu$m, and the thickness of the ejection-opening plate is 11 $\mu$m may be used.

In the section of an ejection opening part 940 provided in the ejection-opening plate including ejection openings 832, a section taken along a direction intersecting the ink-ejecting direction (thickness-wise direction of the orifice plate 935) is substantially in a star form which is generally constituted of 6 projected portions 832*a* each having a corner of an obtuse angle and 6 recessed portions 832*b* each having a corner of an acute angle alternately arranged between these projected portions 832*a*. More specifically, 6 grooves are formed in the thickness-wise direction (liquid-ejecting direction) of the orifice plate shown in FIG. 16, where the recessed portion 832*b* locally distant from the center O of the ejection opening is set as the top thereof and the projected portion 832*a* locally near from the center O of the ejection opening is set as a base (see 1141*a* in FIG. 21 as to the position of the groove).

Figure 18:
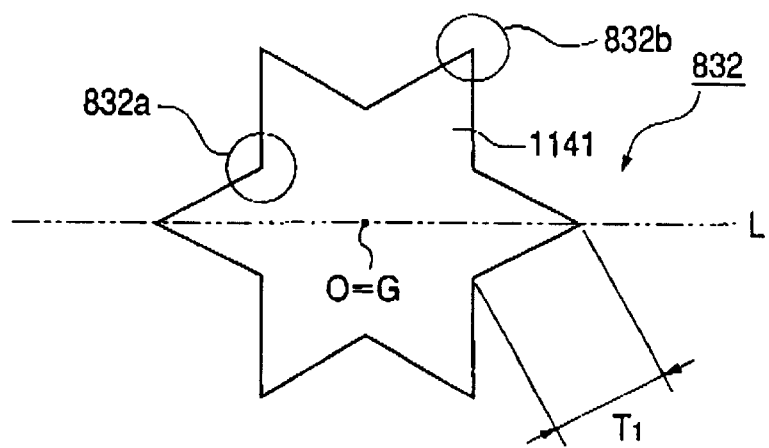
FIG. 18 is an enlarged view illustrating a part of the ejection openings shown in FIG. 17.

In this embodiment, with the ejection opening part 940, for example, a section taken along a direction intersecting the thickness-wise direction thereof is in a form such that 2 equilateral triangles having sides of 27 $\mu$m are combined with each other in a state that one of them has been turned by 60 degrees. $T_1$ shown in FIG. 18 is 8 $\mu$m. The angles of the projected portions 832*a* are all 120 degrees, while the angles of the recessed portions 832*b* are all 60 degrees.

Accordingly, the center O of the ejection opening consists with the center of gravity of a polygon formed by connecting the centers (center (center of gravity) of a figure formed by connecting the top of the groove and two bases adjacent to the top) of the grooves adjacent to each other. The opening area of the ejection opening 832 in this embodiment is 400 $\mu$m$^2$, and the opening area (area of the figure formed by connecting the top of the groove and 2 bases adjacent to the top) of the groove is about 33 $\mu$m$^2$ per groove.

Figure 19:
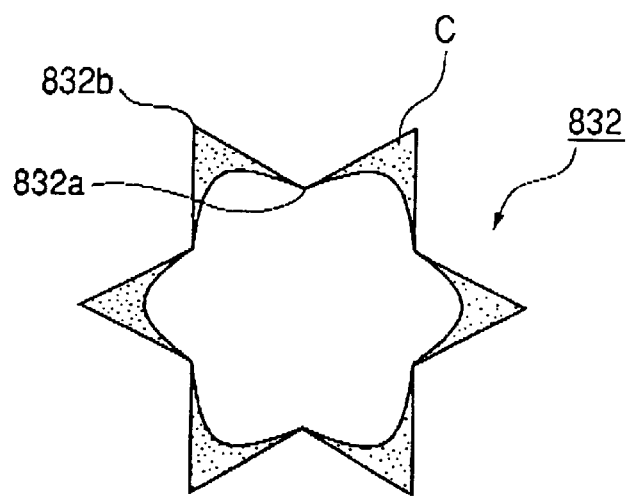
FIG. 19 schematically illustrates a state that an ink has attached to the ejection opening portion shown in FIG. 18.

FIG. 19 is a typical drawing illustrating a state that an ink has attached to the ejection opening portion shown in FIG. 18.

Figure 21:
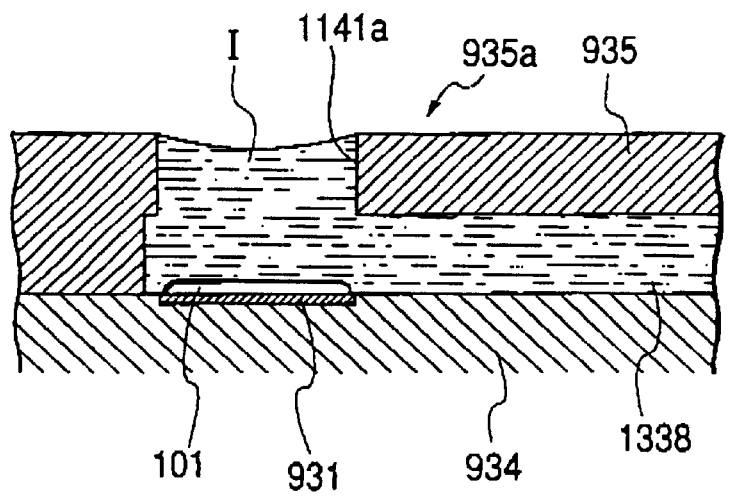
FIG. 21 is a schematic cross-sectional view corresponding to an X—X perspective sectional form in FIG. 20 and illustrating an ejecting operation of a liquid in the liquid-ejecting head with time together with FIGS. 22 to 28.
Figure 28:
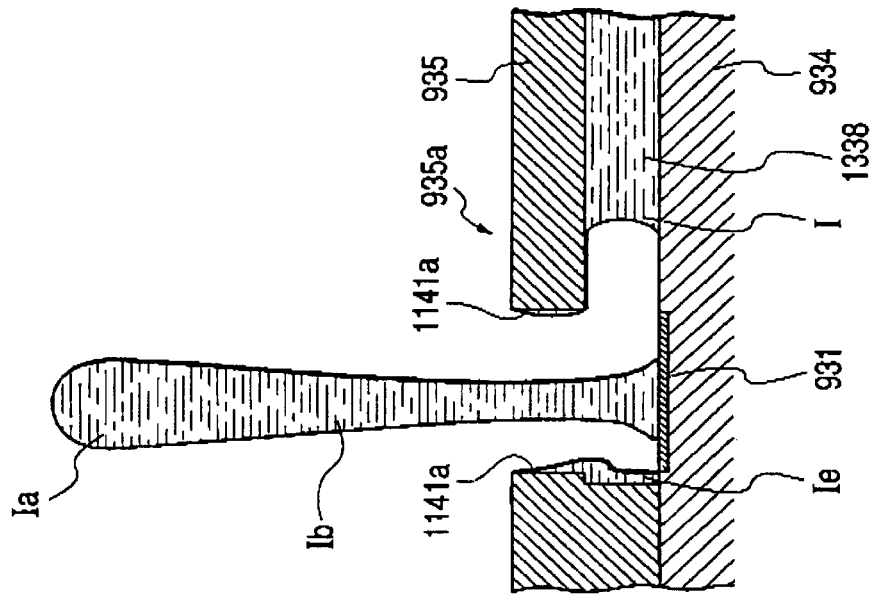
FIG. 28 is a schematic cross-sectional view corresponding to an X—X perspective sectional form in FIG. 20 and illustrating an ejecting operation of the liquid in the liquid-ejecting head with time together with FIGS. 21 to 27.

An ejecting operation of a liquid by the ink-jet recording head of the above-described construction will hereinafter be described with reference to FIGS. 21 to FIGS. 21 to 28 are cross-sectional views for illustrating the ejecting operation of a liquid by the liquid-ejecting head shown in FIGS. 16 to 20 and are cross-sectional views of the bubbling chamber 1337 shown in FIG. 20 taken along line X—X. In this section, an end of the ejection opening part 940 in the thickness-wise direction of the orifice plate is the top 1141*a* of a groove 1141.

FIG. 21 illustrates a state that a film-like bubble has been formed on the heater, and FIGS. 22, 23, 24, 25, 26, 27 and 28 illustrate states after about 1 $\mu$s from the state in FIG. 21, after about 2 $\mu$s from the state in FIG. 21, after about 3 $\mu$s from the state in FIG. 21, after about 4 $\mu$s from the state in FIG. 21, after about 5 $\mu$s from the state in FIG. 21, after about 6 $\mu$s from the state in FIG. 21 and after about 7 $\mu$s from the state in FIG. 21, respectively. In the following description, "drop" or "drop-in" does not mean drop in the so-called gravity direction, but means the movement in the direction of an electrothermal converter irrespective of the installing direction of a head.

Figure 22:
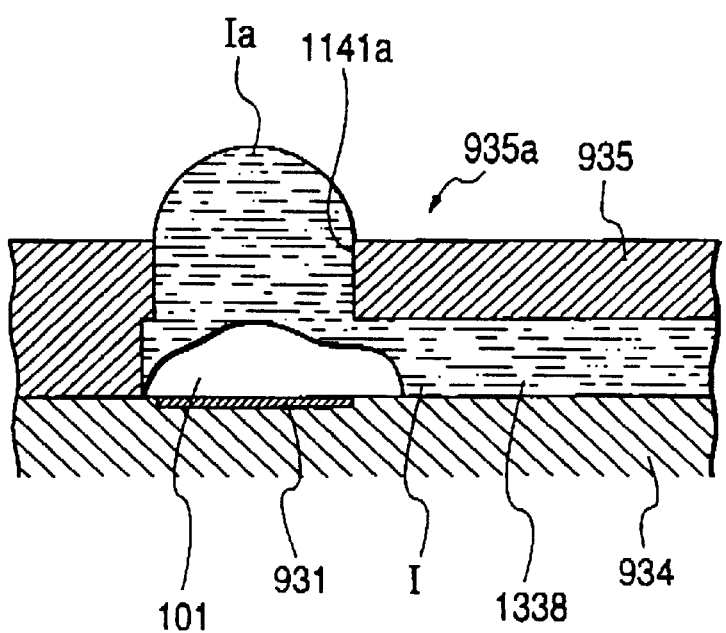
FIG. 22 is a schematic cross-sectional view corresponding to an X—X perspective sectional form in FIG. 20 and illustrating an ejecting operation of the liquid in the liquid-ejecting head with time together with FIGS. 21 and 23 to 28.
Figure 23:
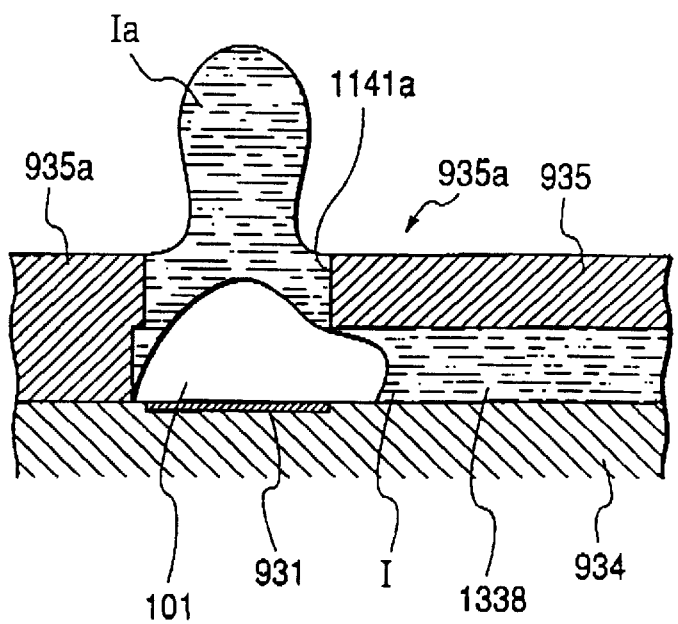
FIG. 23 is a schematic cross-sectional view corresponding to an X—X perspective sectional form in FIG. 20 and illustrating an ejecting operation of the liquid in the liquid-ejecting head with time together with FIGS. 21, 22 and 24 to 28.

When a bubble is first formed in a liquid flow path 1338 on a heater 931 by energizing the heater 931 on the basis of a recording signal or the like as illustrated in FIG. 21, the bubble quickly volumetrically expands and grows during about 2 $\mu$s as illustrated in FIGS. 22 and 23. The height of the bubble 101 with the greatest volume exceeds the ejection opening face 935*a*. At this time, the pressure of the bubble decreases to from several fractions to ten and odds of fractions of the atmospheric pressure.

Figure 24:
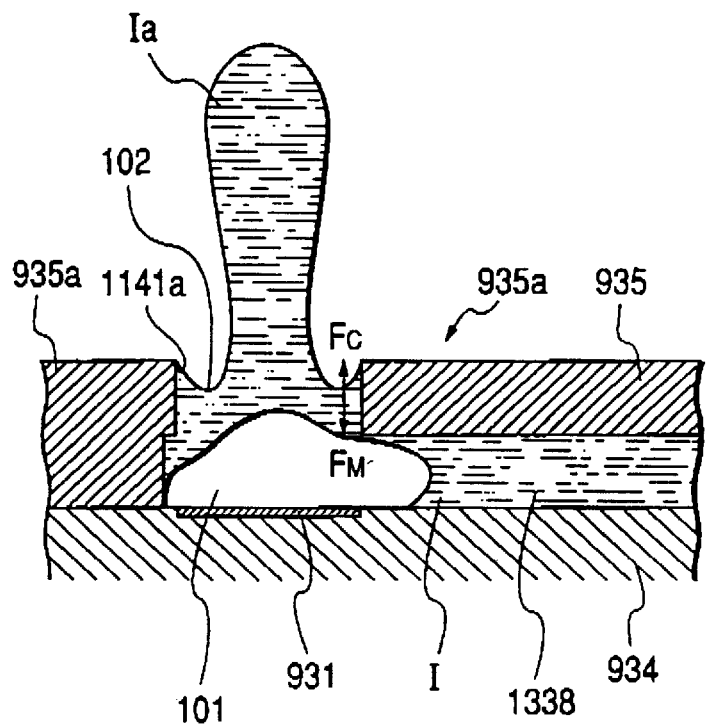
FIG. 24 is a schematic cross-sectional view corresponding to an X—X perspective sectional form in FIG. 20 in the liquid-ejecting head and illustrating an ejecting operation of the liquid in the liquid-ejecting head with time together with FIGS. 21 to 23 and 25 to 28.

At the time about 2 $\mu$s have elapsed from the formation of the bubble, the volume of the bubble 101 turns from the greatest volume to decreased volume as described above, and at substantially the same time as this, the formation of a meniscus 102 is started. The meniscus 102 also recedes, i.e., drops in the direction of the heater 931 as illustrated in FIG. 24.

In this embodiment, the ejection opening part has a plurality of grooves 1141 in a dispersed state, whereby capillary force acts in an opposite direction $F_C$ to the receding direction $F_M$ of the meniscus at the portion of the groove 1141 when the meniscus 102 recedes. As a result, the forms of the meniscus and a main droplet (hereinafter also referred to as "liquid" or "ink" in some cases) la at the time the meniscus recedes are compensated so as to give substantially symmetrical forms to the center of the ejection opening even if some variation is observed in the state of the bubble 101 by some cause.

Figure 25:
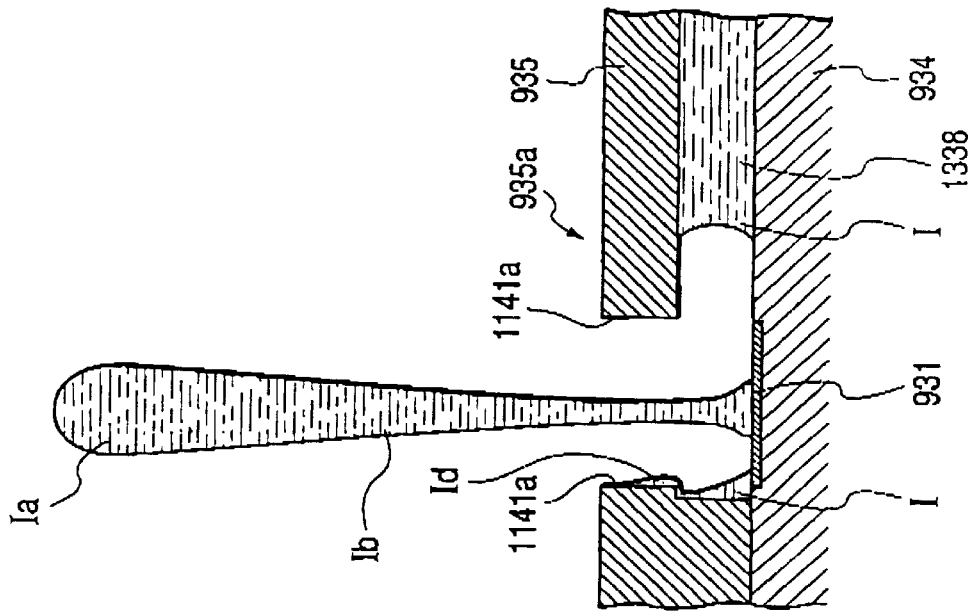
FIG. 25 is a schematic cross-sectional view corresponding to an X—X perspective sectional form in FIG. 20 and illustrating an ejecting operation of the liquid in the liquid-ejecting head with time together with FIGS. 21 to 24 and 26 to 28.

In this embodiment, the dropping velocity of this meniscus 102 is faster than the contracting velocity of the bubble 101, so that the bubble 101 communicates with the air in the vicinity of the lower surface of the ejection opening 832 at the time about 4 $\mu$s have elapsed from the formation of the bubble as illustrated in FIG. 25. At this time, the liquid (ink)

in the vicinity of the central axis of the ejection opening 832 drops toward the heater 931, because the liquid (ink) 1$a$ pulled back on the side of the heater 931 by the negative pressure of the bubble 101 before the communication with the air retains the velocity in the direction toward the heater 931 by virtue of inertia even after the communication with the air.

Figure 26:
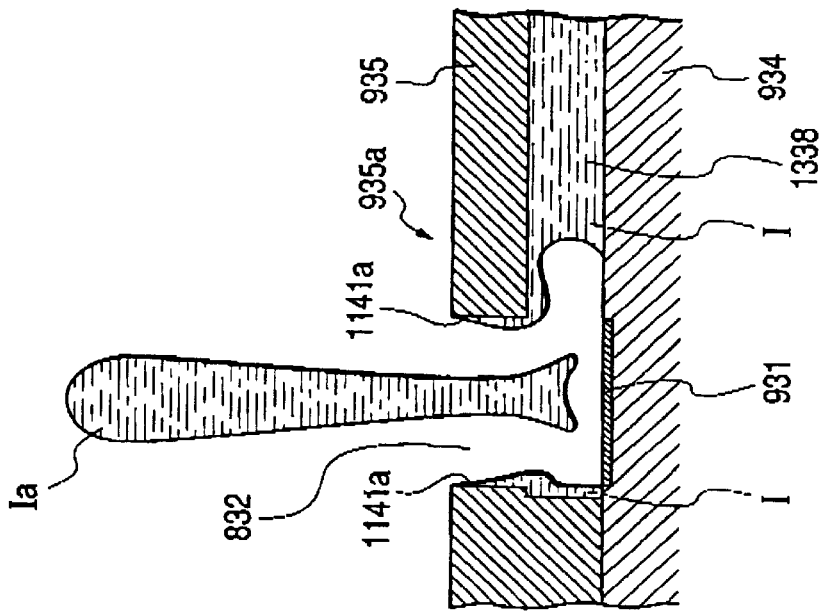
FIG. 26 is a schematic cross-sectional view corresponding to an X—X perspective sectional form in FIG. 20 and illustrating an ejecting operation of the liquid in the liquid-ejecting head with time together with FIGS. 21 to 25, 27 and 28.
Figure 27:
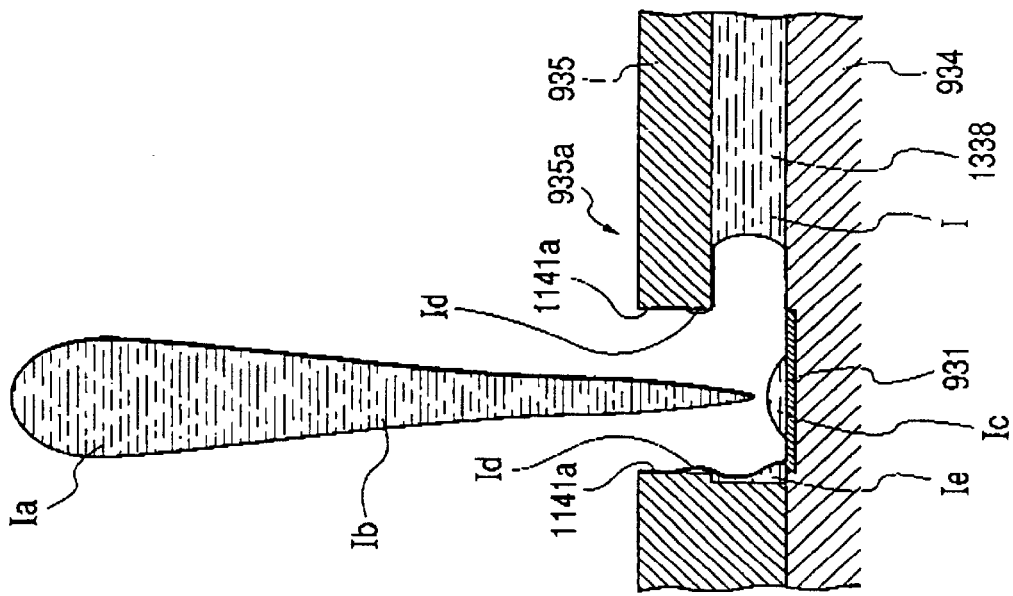
FIG. 27 is a schematic cross-sectional view corresponding to an X—X perspective sectional form in FIG. 20 and illustrating an ejecting operation of the liquid in the liquid-ejecting head with time together with FIGS. 21 to 26 and 28.

The liquid (ink) dropped toward the side of the heater 931 reaches the surface of the heater 931 at the time about 5 $\mu$s have elapsed from the formation of the bubble as illustrated in FIG. 26, and spreads so as to cover the surface of the heater 931 as illustrated in FIG. 27. The liquid spread so as to cover the surface of the heater 931 as described above has a vector in a horizontal direction along the surface of the heater 931. However, a vector in a direction intersecting the surface of the heater 931, for example, in a vertical direction vanishes, so that the liquid acts to remain on the surface of the heater 931, thereby pulling a liquid located on the upper side than such a liquid, i.e., a liquid keeping a velocity vector in the ejecting direction, downward.

Thereafter, a liquid portion 1$b$ between the liquid spread on the surface of the heater 931 and the liquid (main droplet) located on the upper side becomes thin, and is broken in the center of the surface of the heater 931 at the time about 7 $\mu$s have elapsed from the formation of the bubble as illustrated in FIG. 28, whereby the liquid is separated into the liquid 1$a$ keeping a velocity vector in the ejecting direction and the liquid 1$c$ spread on the surface of the heater 931. The position of such separation is desirably the interior of the liquid flow path 1338, more preferably a side closer to the electrothermal converter 931 than the ejection opening 832.

The main droplet 1$a$ is ejected from the central portion of the ejection opening 832 without deviation in the ejecting direction and ejection slippage and landed at the prescribed position of a recording surface on a recording medium. The liquid 1$c$ spread on the surface of the heater 931 is ejected as a satellite droplet following the main droplet up to now. However, it remains on the surface of the heater 931 without being ejected.

Since the ejection of the satellite droplet can be prevented as described above, splash which is apt to occur due to the ejection of the satellite droplet can be prevented, and the record-receiving surface of the recording medium can be surely prevented from being stained with mist suspending in the form of fog. In FIGS. 25 to 28, reference characters 1$d$ and 1$e$ indicate an ink (ink within the groove) attaching to the groove portion and an ink remaining in the liquid flow path, respectively.

As described above, in the liquid-ejecting head according to this embodiment, the direction toward which the main droplet is ejected can be stabilized by a plurality of grooves dispersed around the center of the ejection opening when the liquid is ejected at the stage that the volume of the bubble decreases after growing into the greatest volume. As a result, a liquid-ejecting head free of slippage in the ejecting direction and high in landing accuracy can be provided. In addition, ejection can be stably conducted against the variation of bubbling at high driving frequency, whereby high-speed and high-definition printing can be realized .

In particular, the liquid is ejected by communicating the bubble with the air for the first time at the stage that the volume of the bubble decreases, whereby mist caused by the ejection of the droplet under the communication of the bubble with the air can be prevented, so that the state that droplets attach to the ejection opening face, which forms a main cause of the so-called sudden ejection failure, can also be inhibited.

As another embodiment of the recording head of the ejection system in which a bubble is communicated with the air at the time of the ejection may be mentioned the so-called edge shooter type as described in, for example, Japanese Patent No. 2,783,647.

The present invention has excellent effects in the ink-jet recording systems, in particular, in recording heads and recording apparatus of an ink-jet system in which thermal energy is utilized to form a droplet to be ejected, thereby conducting recording.

With respect to the typical construction and principle thereof, those using the basic principle disclosed in, for example, U.S. Pat. Nos. 4,723,129 and 4,740,796 are preferred. This system may be applied to any of the so-called On-Demand type and continuous type. In particular, the On-Demand type is effective because at least one driving signal which corresponds to recording information and gives a rapid temperature rise exceeding nuclear boiling is applied to an electrothermal converter arranged corresponding to a sheet or liquid path, in which a liquid (ink) is retained, thereby making the electrothermal convertor generate thermal energy to cause film boiling on the heat-acting surface of a recording head, so that a bubble can be formed in the liquid (ink) in response to the driving signal in the relation of one to one. The liquid (ink) is ejected through an ejection opening by the growth-contraction of this bubble to form at least one droplet. When the driving signal is applied in the form of a pulse, the growth-contraction of the bubble is suitably conducted in a moment, so that the ejection of the liquid (ink) excellent, in particular, in responsiveness can be achieved. It is therefore preferable to use such pulsed signals.

As the pulsed driving signal, such signals as described in U.S. Pat. Nos. 4,463,359 and 4,345,262 are suitable. When the conditions described in U.S. Pat. No. 4,313,124 that is an invention relating to the rate of temperature rise on the heat-acting surface are adopted, very excellent recording can be conducted.

As the construction of the recording head, such combined constructions (linear liquid flow path or perpendicular liquid flow path) comprised of ejection openings, a liquid flow path and electrothermal converters as disclosed in the above-described publications, and besides, constructions based on U.S. Pat. Nos. 4,558,333 and 4,459,600 which disclose the construction in which a heat-acting portion is arranged in a curved region may also be included in the present invention.

Constructions based on Japanese Patent Application Laid-Open No. 59-123670 which discloses the construction in which a slit common to a plurality of electrothermal converters is used as an ejection part of the electrothermal converters, and Japanese Patent Application Laid-Open No. 59-138461 which discloses the construction in which an opening absorbing pressure wave of thermal energy is provided opposite to an ejection part, may also be effective for the present invention.

Further, as a full-line type recording head having a length corresponding to the longest width of recording media, both of the construction in which the length is met by such a combination of plural recording heads as disclosed in the above-described publications and the construction in which one recording head is integrally formed may be used, and the above-described effects of the present invention can be more effectively exhibited.

In addition, the present invention is effective even when using a replaceable, chip type recording head in which electrical connection to an apparatus body and the feed of an ink from the apparatus body is made feasible by installation in the apparatus body, or a cartridge type recording head in which an ink tank is provided integrally in a recording head itself.

Further, the addition of recovery means for a recording head, preliminary auxiliary means, etc. which are provided as the constitution of the recording apparatus according to the present invention is preferred because the effects of the present invention can be more stabilized. Specifically, capping means for the recording head, cleaning means, pressurizing or sucking means, preliminary heating means comprised of electrothermal converters, other heating elements or a combination thereof, and preliminary ejection mode conducting ejection separate from recording may also be effective for stable recording.

As a recording mode of the recording apparatus, the present invention is extremely effective for not only a recording mode using a main color such as black, but also an apparatus equipped with at least one of composite color of different colors and full color by color mixing which may be created by an integrally constructed recording head or a combination of recording heads.

In the above-described embodiments of the present invention, the inks have been described as liquid. However, inks solidified at room temperature or lower may also be used so far as they are softened or liquid at a temperature higher than room temperature, or exhibit a liquid phase upon application of recording signals used because it is general in the above-described ink-jet systems that the temperature control of an ink itself is conducted within a range of from 30° C. to 70° C. to adjust the viscosity of the ink so as to fall within a stable ejection range.

In addition, the following inks may be used in the present invention: inks that are liquefied by applying thermal energy in accordance with recording signals and ejected as liquid inks, such as inks that the temperature rise due to thermal energy is positively prevented by using the thermal energy as energy for phase change from a solid phase to a liquid phase and inks solidified in a state left standing for the purpose of preventing evaporation of the inks, and inks of a nature that they are liquefied for the first time by thermal energy, such as those already beginning to solidify at the time they reach a recording medium. In such cases, the inks may be in a form such that they are opposed to electrothermal converters while retained as a liquid or solid in recesses or through-holes in a porous sheet as described in Japanese Patent Application Laid-Open No. 54-56847 or 60-71260. In the present invention, the above-described film boiling system is most effective for the above-described inks.

As forms of the recording apparatus according to the present invention, the following may be also adopted: forms that the apparatus is integrally or separately provided as an image output terminal for information processing instruments such as word processors and computers, and forms such as copying machines combined with a reader and facsimiles having a transmitting-receiving function.

The outline of a liquid-ejecting apparatus in which the above-described liquid-ejecting head is installed will hereinafter be described.

Figure 29:
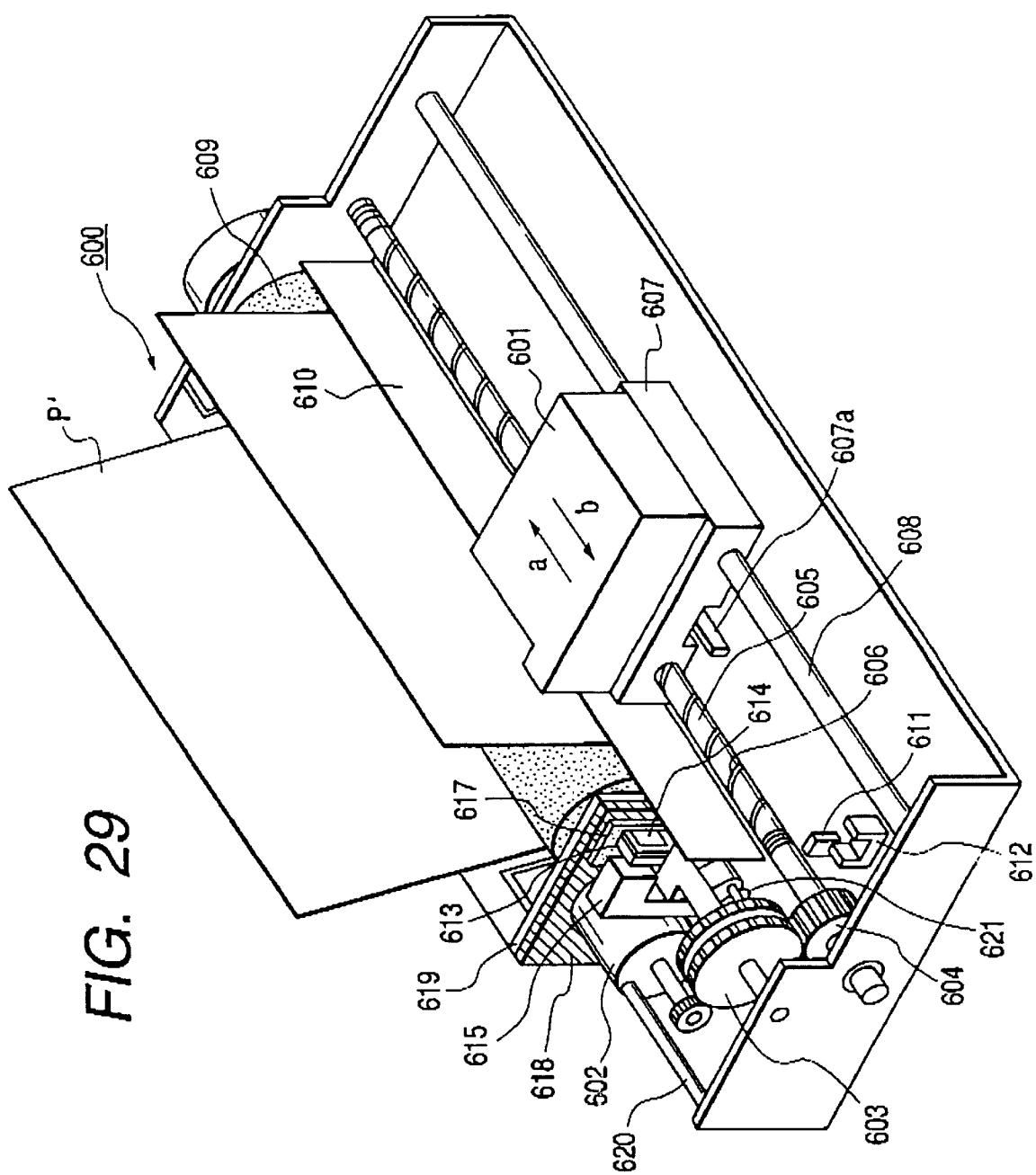
FIG. 29 is a schematic perspective view of an ink-jet recording apparatus which is an example of a liquid-ejecting apparatus to which the liquid-ejecting head according to the present invention can be installed and applied.

FIG. 29 is a schematic perspective view of an ink-jet recording apparatus 600 which is an example of a liquid-ejecting apparatus to which the liquid-ejecting head according to the present invention can be installed and applied.

In FIG. 29, an ink-jet head cartridge 601 is so constructed that the above-described liquid-ejecting head is integrally formed with an ink tank with an ink to be fed to the liquid-ejecting head held therein. The ink-jet head cartridge 601 is mounted on a carriage 607 engaged with a spiral groove 606 in a leadscrew 605 rotating through driving force-transmitting gears 603 and 604 interlocking with the forward and reverse rotations of a driving motor 602 and reciprocatively moved in directions shown by arrows a, b along a guide 608 together with the carriage 607 by the power of the driving motor 602. A recording medium P' is conveyed on a platen roller 609 by a recording medium-conveying means (not illustrated) and pressed against the platen roller 609 over the moving direction of the carriage 607 by a paper presser plate 610.

Photocouplers 611, 612 are arranged in the vicinity of an end of the leadscrew 605. These are home position-detecting means for confirming the presence of a lever 607a of the carriage 607 in this region to conduct change-over of the rotating direction of the driving motor 602, and the like.

A support member 613 serves to support a cap member 614 covering the front surface (ejection opening face) of the ink-jet head cartridge 601, in which ejection openings are present. An ink-sucking means 615 serves to suck an ink collected in the interior of the cap member 614 by empty ejection or the like from the ink-jet head cartridge 601. By this ink-sucking means 615, suction recovery of the ink-jet head cartridge 601 is conducted through an opening (not illustrated) in the cap. A cleaning blade 617 for wiping the ejection opening face of the ink-jet head cartridge 601 is provided movably in forward and backward directions (directions perpendicular to the moving directions of the carriage 607) by means of a moving member 618. These cleaning blade 617 and moving member 618 are supported by a body support 619. The cleaning blade 617 is not limited to this form, and any other well-known cleaning blade may be used.

Upon the suction recovery operation of the liquid-ejecting head, a lever 620 for initiating suction is moved with the movement of a cam 621 engaged with the carriage 607, and the driving power from the driving motor 602 is transfer-controlled by a publicly known means such as clutch shift. An ink-jet recording control part for applying a signal to a heater provided in the liquid-ejecting head of the ink-jet head cartridge 601 and conducting drive control of the above-described respective mechanisms is provided on the side of the apparatus body, which is not illustrated in the drawings.

The ink-jet recording apparatus 600 having the above-described construction conducts recording on the recording medium P' conveyed on the platen roller 609 by the recording medium-conveying means (not illustrated) while reciprocatively moving the ink-jet head cartridge 601 over the full width of the recording medium P'.

As described above, according to the respective embodiments of the present invention, there can be provided water-based pigment inks which are excellent in stability in long-term storage in printing with a black ink upon conducting ink-jet recording, capable of lightening influence of recording media on print quality, providing images high in character quality and image density and excellent in water resistance or fastness, have excellent first ejection property, and can effectively prevent the occurrence of bleed when combined with color inks to provide an ink set, and ink-jet recording processes and ink-jet recording apparatus using such an ink.

According to an aspect of the present invention, the effect brought about by using the self-dispersing carbon black having a great particle diameter can be utilized to the maximum while retaining the good dispersibility of the self-dispersing carbon black having a great particle diameter in the ink, thereby providing ink-jet images having high density.

The present invention will hereinafter be described more specifically by the following Examples and Comparative Examples. However, the present invention is not limited to and by the Examples so far as the subject matter of the present invention is not overstepped. Incidentally, all designations of "part" or "parts" and "%" as will be used in the following examples mean part or parts by weight and % by weight unless expressly noted.

<Pigment Dispersion 1>

After 10 g of carbon black having a specific surface area of 260 m$^2$/g and a DBP oil absorption of 115 ml/100 g and 2.5 g of p-aminobenzoic acid were thoroughly mixed with 72 g of water, 1.62 g of nitric acid was added dropwise to the mixture, followed by stirring at 70° C. After several minutes, a solution of 1.07 g of sodium nitrite in 5 g of water was further added to the mixture, and the resultant mixture was stirred for additional one hour. The resultant slurry was filtered through filter paper (Toyo Filter Paper No. 2, trade name; product of Advantes Co.), and the resultant pigment particles were fully washed with water and dried in an oven controlled to 90° C. Water was added to the dried pigment to prepare an aqueous solution of the pigment having a pigment concentration of 10%. Thus, this process introduced a group represented by the chemical formula

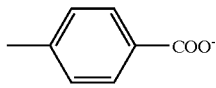

to the surface of the carbon black.

The functional-group density on the surface of the self-dispersing carbon black as prepared above was measured in the following manner and was found to be 2.31 μmol/m$^2$. An ion meter (manufactured by DKK) was used to measure the concentration of sodium ions and the obtained value was then converted to a value for the functional-group density on the surface.

The average particle diameter of the self-dispersing carbon black as prepared above was measured in the following manner and was found to be 94 nm. The measurement was conducted by using a particle diameter measuring equipment ELS-800 (trade name, manufactured by Ohtsuka Denshi K.K.), diluting the above aqueous solution of the pigment to 1/2,000 and finding a cumulant mean on the basis of the principle of the dynamic light scattering method.

<Pigment Dispersion 2>

After 10 g of carbon black having a specific surface area of 260 m$^2$/g and a DBP oil absorption of 115 ml/100 g and 0.5 g of p-aminobenzoic acid were thoroughly mixed with 72 g of water, 1.62 g of nitric acid were added dropwise to the mixture, followed by stirring at 70° C. After several minutes, a solution of 1.07 g of sodium nitrite in 5 g of water was further added to the mixture, and the resultant mixture was stirred for additional one hour. The resultant slurry was filtered through filter paper (Toyo Filter Paper No. 2, trade name; product of Advantes Co.), and the resultant pigment particles were fully washed with water and dried in an oven controlled to 90° C. Water was added to the dried pigment to prepare an aqueous solution of the pigment having a pigment concentration of 10%. With this process a group represented by the chemical formula

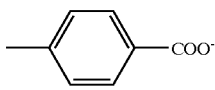

was introduced to the surface of the carbon black.

The functional-group density on the surface and the average particle diameter of the self-dispersing carbon black were measured in the same manner as described above and were found to be 0.96 μmol/m$^2$ and 94 nm, respectively.

<Pigment Dispersion 3>

After 10 g of carbon black having a specific surface area of 240 m$^2$/g and a DBP oil absorption of 65 ml/100 g and 1.2 g of p-aminobenzoic acid were thoroughly mixed with 72 g of water, 1.62 g of nitric acid were added dropwise to the mixture, followed by stirring at 70° C. After several minutes, a solution of 1.07 g of sodium nitrite in 5 g of water was further added to the mixture, and the resultant mixture was stirred for additional one hour. The resultant slurry was filtered through filter paper (Toyo Filter Paper No. 2, trade name; product of Advantes Co.), and the resultant pigment particles were fully washed with water and dried in an oven controlled to 90° C. Water was added to the dried pigment to prepare an aqueous solution of the pigment having a pigment concentration of 10%. With this process a group represented by the chemical formula

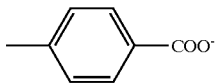

was introduced to the surface of the carbon black.

The functional-group density on the surface and the average particle diameter of the self-dispersing carbon black were measured in the same manner as described above and were found to be 2.26 μmol/m$^2$ and 85 nm, respectively.

These pigment dispersions were then respectively used to prepare Black Inks 1 to 3 in accordance with the following process.

EXAMPLE 1

(Black Ink 1)

The following components were mixed and thoroughly stirred into a solution. The resultant solution was then filtered under pressure through a microfilter (product of Fuji Photo Film Co., Ltd.) having a pore size of 3.0 μm, thereby preparing Black Ink 1.

| | |
|---|---|
| Pigment Dispersion 1 described above | 30 parts |
| Ammonium benzoate | 1 part |
| Trimethylolpropane | 6 parts |
| Glycerol | 5 parts |
| Diethylene glycol | 5 parts |
| Ethylene oxide adduct of acetylene glycol (Acetylenol EH, trade name) | 0.15 parts |
| Water | 52.85 parts. |

EXAMPLE 2

(Black Ink 2)

The following components were mixed and thoroughly stirred into a solution. The resultant solution was then filtered under pressure through a microfilter (product of Fuji Photo Film Co., Ltd.) having a pore size of 3.0 μm, thereby preparing Black Ink 2.

| Pigment Dispersion 3 described above | 30 parts |
|---|---|
| Ammonium benzoate | 1 part |
| Trimethylolpropane | 6 parts |
| Glycerol | 5 parts |
| Diethylene glycol | 5 parts |
| Ethylene oxide adduct of acetylene glycol (Acetylenol EH, trade name) | 0.15 parts |
| Water | 52.85 parts. |

Comparative Example 1

(Black Ink 3)

The following components were mixed and thoroughly stirred into a solution. The resultant solution was then filtered under pressure through a microfilter (product of Fuji Photo Film Co., Ltd.) having a pore size of 3.0 µm, thereby preparing Black Ink 3.

| Pigment Dispersion 2 described above | 30 parts |
|---|---|
| Ammonium benzoate | 1 part |
| Trimethylolpropane | 6 parts |
| Glycerol | 5 parts |
| Diethylene glycol | 5 parts |
| Ethylene oxide adduct of acetylene glycol (Acetylenol EH, trade name) | 0.15 parts |
| Water | 52.85 parts. |

Main features of the black inks according to EXAMPLES 1 and 2 and COMPARATIVE EXAMPLE 1 are shown collectively in Table 1.

TABLE 1

|  | Functional group density on surface ($\mu$mol/m$^2$) | Average particle diameter (nm) |
|---|---|---|
| Ex. 1 | 2.31 | 94 |
| Ex. 2 | 2.26 | 85 |
| Comp. Ex. 1 | 0.96 | 94 |

(Evaluation)

Each of the black inks according to EXAMPLES 1 and 2 and COMPARATIVE EXAMPLE 1 was used to conduct the following evaluation by means of an Ink-jet recording apparatus (BJF-600, trade name, manufactured by Canon Inc.) having an On-Demand type multi-recording head which ejects an ink by applying thermal energy in response to recording signals to the ink. The results are shown in Table 2.

1) Intermittent Ejection Stability

The ink-Jet recording apparatus was charged with each of the above-described black inks and left to stand in a thermohygrostat of 15° C./10% for one hour. Thereafter, the ink was ejected dot by dot from each nozzle and, after 5 seconds, ejected dot by dot from each nozzle again. This printing cycle was repeated 10 times. The print of each one dot was evaluated in accordance with the following standards:

a: No printing disorder was observed on all the nozzle in all the ten printing cycles:

b: Printing disorder was scarcely observed on all the nozzles in all the ten printing cycles;

c: Printing disorder was observed in the ten printing cycles, but was on the level causing no problem in practical use; and d: Printing disorder was observed in the ten printing cycles.

The following plain papers A to E for copying were used as the recording media in the evaluation.

A: PPC PAPER NSK (trade name, product of canon Inc.),

B: PPC PAPER NDK (trade name, product of Canon Inc.),

C: PPC PAPER 4024 (trade name, product of Xerox Co., Ltd.),

D: PPC PAPER PLOVER BOND (trade name, product of Fox River Co.)

E: CANON PPC PAPER (product of Noididora Co.).

Plain papers A, B, C, D and E for copying which are given in the following all correspond to those plain papers A, B, C, D and E.

2) Image or Printing Density

Printing was conducted on each of the above-described recording media, and at this time, the printing density was measured by means of a densitometer (manufactured by Macbeth Company), and evaluation was made in accordance with the following standards:

a: A difference in printing density among the plain papers A, B, C, D and E for copying was lower than 0.1 between the maximum and the minimum; and c: A difference in printing density among the plain papers A, B, C, D and E for copying was not lower than 0.1 between the maximum and the minimum.

3) Quality of Character

The above-prepared black inks were used to conduct printing of characters on the plain papers A, B, C, D and E for copying, which are different in permeability to ink from one another, by means of the above-described ink-jet recording apparatus. At this time, the quality of character was evaluated by whether feathering occurred or not in accordance with the following standards.

a: Feathering was scarcely seen on the 5 kinds of paper;

b: Feathering was somewhat seen on some papers; and c: Feathering occurred on all the 5 kinds of paper.

4) Water Fastness

The above-prepared black inks were used to conduct printing of characters on the plain papers A, B, C, D and E for copying by means of the above-described ink-jet recording apparatus. After a predetermined period of time elapsed from the printing, the recording media printed were dipped with running water to visually observe the state of background staining. The result thereof was evaluated in accordance with the following standards:

a: Background stain became inconspicuous in all the plain papers A, B, C, D and E for copying within one hour after the printing;

b: Background stain became inconspicuous in all the plain papers A, B, C, D and E for copying within one day after the printing; and c: Background stain was conspicuous in some papers even after at least one day had elapsed from the printing.

5) Shelf Stability

The above-described black inks were evaluated as to shelf stability thereof. More specifically, two 100-ml glass containers (product of Shot Co.) were provided, and each 100 ml of the black inks were separately placed in these containers, and the glass containers were left to stand for one month in an environment of 60° C. to observe whether a change in the viscosity of the inks occurred or not before and after left to stand. The results thereof were evaluated in accordance with the following standards.

a: A change in the viscosity of the ink was scarcely observed before and after left to stand;

b: A change in the viscosity of the ink was observed before and after left to stand, but was on the level causing no problem in practical use;

c: A great change in the viscosity of the ink was observed before and after left to stand.

TABLE 2

|  | 1) | 2) | 3) | 4) | 5) |
|---|---|---|---|---|---|
| Ex. 1 | a | a | a | a | a |
| Ex. 2 | a | a | a | a | a |
| Comp. Ex. 1 | a | a | a | a | b |

(Note)
1) Intermittent ejection stability;
2) Printing density;
3) Quality of character;
4) Water fastness;
5) Shelf stability.

As apparent from the results shown in Table 2, it was found that the inks according to the Examples of the present invention can provide images high in the character quality and printing density when printing was conducted by, for example, an ink-jet recording method, and were little in dependency on the kinds of paper. Further, they were also excellent in the shelf stability.

As an additional experiment, Black Ink 1-A was prepared which has the same ink composition as that in EXAMPLE 1 except that the ammonium benzoate was removed and substituted with water in the corresponding amount.

Black Ink 2-A was also prepared which has the same ink composition as that in EXAMPLE 2 except that the ammonium benzoate was removed and substituted with water in the corresponding amount. These inks were used to conduct the same printing as in the evaluation as to printing density on the plain papers A, B, C, D and E for copying by means of the above-described ink-jet recording apparatus. At this time, the printing density was measured by means of a densitometer (manufactured by Macbeth Company), thereby obtaining the following results.

(Results)

The average printing density of Black Ink 1 on the 5 kinds of paper was higher by at least 0.2 than the average printing density of Black Ink 1-A, to which no salt was added, on the 5 kinds of paper.

The average printing density of Black Ink 2 on the 5 kinds of paper was higher by about 0.1 than the average printing density of Black Ink 2-A, to which no salt was added, on the 5 kinds of paper.

From these results, it is understood that the printing density of ink can be more effectively improved according to the Examples of the present invention by using the self-dispersing anionic carbon black having an average particle diameter of at least 90 nm and adding the salt to the ink.

EXAMPLE 3

Black Ink 1, Yellow Ink 1, Magenta Ink 1 and Cyan Ink 1 respectively prepared in the following manner were combined with one another to provide an ink set according to this example.

(Black Ink 1)

A black ink was prepared in the same manner as in the case of Black Ink 1 in EXAMPLE 1.

(Yellow Ink 1)

The following components were mixed and thoroughly stirred into a solution. The resultant solution was then filtered under pressure through a microfilter (product of Fuji Photo Film Co., Ltd.) having a pore size of 0.2 µm, thereby preparing Yellow Ink 1.

| Ethylene oxide adduct of acetylene glycol (Acetylenol EH, trade name) | 1 parts |
|---|---|
| Diethylene glycol | 10 parts |
| Glycerol | 5 parts |
| C.I. Direct Yellow 86 | 3 parts |
| Water | 81 parts. |

(Magenta Ink 1)

The following components were mixed and thoroughly stirred into a solution. The resultant solution was then filtered under pressure through a microfilter (product-of Fuji Photo Film Co., Ltd.) having a pore size of 0.2 µm, thereby preparing Magenta Ink 1.

| Ethylene oxide adduct of acetylene glycol (Acetylenol EH, trade name) | 1 parts |
|---|---|
| Diethylene glycol | 10 parts |
| Glycerol | 5 parts |
| C.I. Acid Red 35 | 3 parts |
| Water | 81 parts. |

(Cyan Ink 1)

The following components were mixed and thoroughly stirred into a solution. The resultant solution was then filtered under pressure through a microfilter (product of Fuji Photo Film Co., Ltd.) having a pore size of 0.2 µm, thereby preparing Cyan Ink 1.

| Ethylene oxide adduct of acetylene glycol (Acetylenol EM, trade name) | 1 parts |
|---|---|
| Diethylene glycol | 10 parts |
| Glycerol | 5 parts |
| C.I. Acid Blue 9 | 3 parts |
| Water | 81 parts. |

Comparative Example 2

Black Ink 3 prepared in COMPARATIVE EXAMPLE 1 was combined with Yellow Ink 1, Magenta Ink 1 and Cyan Ink 1 prepared in EXAMPLE 3 to provide an ink set according to this comparative example.

Each of the ink sets obtained in EXAMPLE 3 and COMPARATIVE EXAMPLE 2 was used to make the following evaluation by means of an ink-jet recording apparatus, BJF-600 (trade name, manufactured by Canon Inc.) having an On-Demand type multi-recording head which ejects an ink by applying thermal energy in response to recording signals to the ink. The results thereof are shown in Table 3.

(Bleeding)

As an printed image for evaluating resistance to bleeding was used a printed image obtained in the following manner. A square area of 10 cm in each side on each of the plain papers was divided into 5×5 squares, and solid black images and solid color images were alternately printed thereon with the black ink and each of the color inks. The degree of bleeding at boundaries between the area printed with the black ink and the area printed with each color ink was observed to evaluate the ink sets as to the resistance to bleeding in accordance with the following standards. The results are shown in Table 3.

Evaluation Standards of Resistance to Bleeding a; A boundary line between the two colored areas was distinct, and neither bleeding nor color mixing was observed at the boundary;

b: A boundary line between the two colored areas was clearly present, but some bleeding or color mixing was observed at the boundary in some papers;

c: A boundary line between the two colored areas was indistinguishable.

TABLE 3

|  | Resistance to bleeding |
|---|---|
| Example 3 | a |
| Comparative Example 2 | c |

As apparent from the results shown in Table 3, the ink set of COMPARATIVE EXAMPLE 2 was unsatisfactory in resistance to bleeding. On the other hand, the ink set of EXAMPLE 3 were able to stably provide good color ink-jet recorded images, in which bleeding was restrained, on all the recording media.

What is claimed is:

1. An ink comprising at least one salt selected from the group consisting of $(M^1)_2SO_4$, $CH_3COO(M^1)$, Ph-COO(M), $(M^1)NO_3$, $(M^1)Cl$, $(M^1)Br$, $(M^1)I$, $(M^1)_2SO_2$ and $(M^1)_2CO_3$, wherein $M^1$ represents an alkali metal, ammonium or organic ammonium, and Ph represents a phenyl group, and self-dispersing anionic carbon black having a functional-group density of at least 1.8 ($\mu$mol/m$^2$) on its surface.

2. The ink according to claim 1, wherein the salt is contained in a proportion of 0.05 to 10% by weight based on the total weight of the ink.

3. The ink according to claim 2, wherein the salt is contained in a proportion of 0.1 to 5% by weight based on the total weight of the ink.

4. The ink according to claim 1, wherein the self-dispersing anionic carbon black has at least one hydrophilic group bonded directly or through another atomic group to the surface thereof.

5. The ink according to claim 4, wherein the hydrophilic group is selected from the group consisting of $-COO(M^2)$, $-SO_2(M^2)_2$, $-PO_3H(M^2)$ and $-PO_3(M^2)_2$, wherein $M^2$ is a hydrogen atom, an alkali metal, ammonium or organic ammonium.

6. The ink according to claim 4, wherein said another atomic group is an alkylene group having 1 to 12 carbon atoms, a substituted or unsubstituted phenylene group, or a substituted or unsubstituted naphthylene group.

7. The ink according to claim 4, wherein the hydrophilic group is selected from the group consisting of $-COO(M^2)$, $-SO_3(M^2)_2$ and $-PO_3(M^2)_2$, and $M^2$ in the above formulae is identical with $M^1$ in the formulae representing the salt in claim 1.

8. An ink comprising at least one salt selected from the group consisting of $(M^1)_2SO_4$, $CH_3COO(M^1)$, Ph-COO $(M^1)$, $(M^1)NO_3$, $(M^1)Cl$, $(M^1)Br$, $(M^1)I$, $(M^1)_2SO_3$ and $(M^1)_2CO_3$, wherein $M^1$ represents an alkali metal, ammonium or organic ammonium, and Ph represents a phenyl group, and a self-dispersing anionic carbon black having a functional-group density of at least 0.45 (mmol/g) on its surface, the ink undergoing no substantial change in viscosity even when it is stored for one month in an environment of 60° C.

9. The ink according to claim 1 or 8, wherein the self-dispersing anionic carbon black has an average particle diameter of at least 90 nm.

10. The ink according to claim 1 or 8, wherein the ink is an ink for ink-jet.

11. An ink set comprising in combination the black ink according to claim 1 or 8, and a water-based color ink comprising at least one coloring material selected from among coloring materials for cyan, magenta, yellow, red, green and blue.

12. The ink set according to claim 11, wherein the coloring material for the color ink Is an acid dye or a direct dye.

13. The ink set according to claim 11, wherein the coloring material for the color ink is a pigment.

14. The ink set according to claim 11, which is used for ink-jet.

15. An ink cartridge, comprising an ink tank which contains the ink according to claim 1 or 8.

16. A recording unit comprising an ink container portion containing an ink-jet ink and a head portion for ejecting the ink, the ink comprising at least one salt selected from the group consisting of $(M^1)_2SO_4$, $CH_3COO(M^1)$, Ph-COO $(M^1)$, $(M^1)NO_3$, $(M^1)Cl$, $(M^1)Br$, $(M^1)I$, $(M^1)_2SO_3$ and $(M^1)_2CO_3$, wherein $M^1$ represents an alkali metal, ammonium or organic ammonium, and Ph represents a phenyl group, and a self-dispersing anionic carbon black having a functional-group density of at least 1.08 ($\mu$mol/m$^2$) on its surface.

17. A recording unit comprising an ink container portion containing an ink-jet ink and a head portion for ejecting the ink, the ink comprising at least one salt selected from the group consisting of $(M^1)_2SO_4$, $CH_3COO(M^1)$, Ph-COO $(M^1)$, $(M^1)NO_3$, $(M^1)Cl$, $(M^1)Br$, $(M^1)I$, $(M^1)_2SO_3$ and $(M^1)_2CO_3$, wherein $M^1$ represents an alkali metal, ammonium or organic ammonium, and Ph represents a phenyl group, and a self-dispersing anionic carbon black having a functional-group density of at least 0.45 (mmol/g) on its surface, the ink undergoing no substantial change In viscosity even when it is stored for one month in an environment of 60° C.

18. An image recording apparatus comprising an ink container portion containing an ink-jet ink and a recording head for ejecting the ink, the ink comprising at least one salt selected from the group consisting of $(M^1)_2SO_4$, $CH_3COO$ $(M^1)$, Ph-COO$(M^1)$, $(M^1)NO_3$, $(M^1)Cl$, $(M^1)Br$, $(M^1)I$, $(M^1)_2$ $SO_3$ and $(M^1)$ $CO_{31}$ wherein $M^1$ represents an alkali metal, ammonium or organic ammonium, and Ph represents a phenyl group, and a self-dispersing anionic carbon black having a functional-group density of at least 1.8 ($\mu$mol/m$^2$) on its surface.

19. An image recording apparatus comprising an ink container portion containing an ink-jet ink and a recording head for ejecting the ink, the ink comprising at least one-salt selected from the group consisting of $(M^1)_2SO_4$, $CH_3COO$ $(M^1)$, Ph-COO$(M^1)$, (ML)$NO_3$, $(M^1)Cl$, $(M^1)Br$, $(M^1)I$, $(M^1)_2SO_3$ and $(M^1)_2CO_3$, wherein $M^1$ represents an alkali metal, ammonium or organic ammonium, and Ph represents a phenyl group, and a self-dispersing anionic carbon black having a functional-group density of at least 0.45 (mmol/g) on its surface, the ink undergoing no substantial change in viscosity even when it is stored for one month in an environment of 60° C.

20. A color-image recording apparatus comprising an ink container portion containing an ink-jet ink comprising at least one salt selected from the group consisting of $(M^1)_2$ $SO_4$, $CH_3COO(M^1)$, Ph-COO$(M^1)$, $(M^1)NO_3$, $(M^1)Cl$, $(M^1)$ Br, $(M^1)I$, $(M^1)_2SO_3$ and $(M^1)_2CO_3$, wherein $M^1$ represents an alkali metal, ammonium or organic ammonium, and Ph represents a phenyl group, and a self-dispersing anionic carbon black having a functional-group density of at least 1.8 ($\mu$mol/m$^2$) on its surface, another ink container portion containing a water-based color ink comprising at least one coloring material selected from among coloring materials for cyan, magenta, yellow, red, green and blue, and recording head portions for respectively ejecting the inks contained in the respective ink container portions.

21. A color-image recording apparatus comprising an ink container portion containing an ink-jet ink comprising at least one salt selected from the group consisting of $(M^1I)_2$ SO$_4$, CH$_3$COO(M$^1$), Ph-COO(M$^1$), (M$^1$)NO$_3$, (M$^1$)Cl, (M$^1$) Br, (M$^1$)I, (M$^1$)$_2$SO$_3$ and (M$^1$)$_1$CO$_3$, wherein M$^1$ represents an alkali metal, ammonium or organic ammonium, and Ph represents a phenyl group, and a self-dispersing anionic carbon black having a functional-group density of at least 0.45 (mmol/g) on its surface, the ink undergoing no substantial change in viscosity even when it is stored for one month In an environment of 60° C., another ink container portion containing a water-based, ink-jet color ink comprising at least one coloring material selected from among coloring materials for cyan, magenta, yellow, red, green and blue, and recording head portions for respectively ejecting the inks contained in the respective Ink container portions.

22. An image recording process comprising the step of ejecting an ink-jet ink toward the surface of a recording medium to apply the ink to the surface thereof, thereby recording an image, wherein the ink comprises at least one salt selected from the group consisting of (M$^1$)$_2$SO$_4$, CH$_3$COO(M$^1$), Ph-COO(M$^1$), (M$^1$)NO$_3$, (M$^1$)Cl, (M$^1$)Br, (M$^1$)I, (M$^1$)$_2$SO$_3$ and (M$^1$)$_2$CO$_3$, wherein M$^1$ represents an alkali metal, ammonium or organic ammonium, and Ph represents a phenyl group, and a self-dispersing anionic carbon black having a functional-group density of at least 1.8 ($\mu$mol/m$^2$) on its surface.

23. An image recording process comprising the step of ejecting an ink toward the surface of a recording medium to apply the ink to the surface thereof, thereby recording an image, wherein the ink comprises at least one salt selected from the group consisting of (M$^1$)$_2$SO$_4$, CH$_3$COO(M$^1$), Ph-COO(M$^1$), (M$^1$)NO$_3$, (M$^1$)Cl, (M$^1$)Br, (M$^1$)I, (M$^1$)$_2$SO$_3$ and (M$^1$)$_2$CO$_3$, wherein M$^1$ represents an alkali metal, ammonium or organic ammonium, and Ph represents a phenyl group, and self-dispersing anionic carbon black having a functional-group density of at least 0.45 (mmol/g) on its surface, the ink undergoing no substantial change in viscosity even when it is stored for one month in an environment of 60° C.

24. The image recording process according to claim 22 or 23, wherein the energy for ejecting the ink is thermal energy.

25. The image recording process according to claim 22 or 23, wherein the energy for ejecting the ink is mechanical energy.

26. A process for forming a color image comprising the steps of ejecting a first water-based, ink-jet ink comprising at least one coloring material selected from among coloring materials for cyan, magenta, yellow, red, green and blue toward the surface of a recording medium to apply the ink to the surface thereof; and ejecting a second ink-jet ink comprising at least one salt selected from the group consisting of (M$^1$)$_2$SO$_4$, CH$_3$COO(M$^1$), Ph-COO(M$^1$), (M$^1$)NO$_3$, (M$^1$)Cl, (M$^1$)Br, (M$^1$)I, (M$^1$)$_2$SO$_3$ and (M$^1$)$_2$CO$_3$, wherein M$^1$ represents an alkali metal, ammonium or organic ammonium, and Ph represents a phenyl group, and a self-dispersing anionic carbon black having a functional-group density of at least 1.8 ($\mu$mol/m$^2$) on its surface toward the surface of the recording medium to apply the second ink to the surface thereof.

27. A process for forming a color image comprising the steps of ejecting a first water-based, ink-jet ink comprising at least one coloring material selected from among coloring materials for cyan, magenta, yellow, red, green and blue toward the surface of a recording medium to apply the ink to the surface thereof; and ejecting a second ink-jet ink toward the surface of the recording medium to apply the second ink to the surface second ink-jet ink comprising at least one salt selected from the group consisting of (M$^1$)$_2$SO$_4$, CH$_3$COO(M$^1$), Ph-COO(M$^1$), (M$^1$)NO$_3$, (M$^1$)Cl, (M$^1$)Br, (M$^1$)I, (M$^1$)$_2$SO$_3$ and (M$^1$)$_2$CO$_3$, wherein M$^1$ represents an alkali metal, ammonium or organic ammonium, and Ph represents a phenyl group, and a self-dispersing anionic carbon black having a functional-group density of at least 0.45 (mmol/g) on its surface, the second ink-jet ink undergoing no substantial change in viscosity even when it is stored for one month In an environment of 60° C.

28. A water-based ink-jet ink comprising a self-dispersing carbon black having an average particle diameter of at least 90 nm and being stably dispersed in an aqueous medium, and a salt, wherein the carbon black has a surface functional-group density of at least 1.8 $\mu$mol/m$^2$ and gives an optical density of an image obtained by the ink, the optical density being decreased if the salt is not present, and the salt alleviates the decrease in optical density.

29. A method for improving the optical density of an ink-jet recorded image formed with an ink comprising a self-dispersing carbon black having an average particle diameter of at least 90 nm and a surface functional-group density of at least 1.8 $\mu$mol/m$^2$ and being stably dispersed in an aqueous medium, the method comprising causing a salt to be contained in the ink as an agent for inhibiting penetration of the self-dispersing carbon black into the interior of a recording medium, the optical density being decreased if the salt is not present, and the salt alleviates the decrease in optical density.

* * * * *

UNITED STATES PATENT AND TRADEMARK OFFICE
CERTIFICATE OF CORRECTION

PATENT NO.    : 6,521,034 B1
DATED         : February 18, 2003
INVENTOR(S)   : Koichi Osumi et al.

It is certified that error appears in the above-identified patent and that said Letters Patent is hereby corrected as shown below:

Column 1,
Line 16, "ink-Jet" should read -- ink-jet --.
Line 46, "cases" should read -- cases. --.
Line 62, "of-color" should read -- of color --.
Line 66, "ink- et," should read -- ink-jet, --.

Column 3,
Line 3, "Ammonium" should read -- ammonium --.

Column 4,
Line 3, "inks" should read -- ink. --.

Column 6,
Line 4, "triethanolammonium" should read -- triethanolammonium. --.
Line 42, "occur" should read -- occur. --.

Column 7,
Line 9, "prevented" should read -- prevented. --.

Column 8,
Line 39, "ink" should read -- ink. --.

Column 9,
Line 6, "Ink," should read -- ink, --.

Column 10,
Line 2, "been-added" should read -- been added --.
Line 23, "Ink." should read -- ink. --.
Line 26, "Ink" should read -- ink --.
Line 50, "recognized" should read -- recognized. --.
Line 52, "In" should read -- in --.

Column 11,
Line 9, "the." should read -- the --.
Line 31, "Is" should read -- is --.
Line 64, "Ink" should read -- ink --.

Column 12,
Line 62, "Is" should read -- is --.

UNITED STATES PATENT AND TRADEMARK OFFICE
CERTIFICATE OF CORRECTION

PATENT NO. : 6,521,034 B1
DATED : February 18, 2003
INVENTOR(S) : Koichi Osumi et al.

It is certified that error appears in the above-identified patent and that said Letters Patent is hereby corrected as shown below:

Column 13,
Line 17, "used" should read -- used. --.

Column 14,
Line 37, "can-be" should read -- can be --.
Line 63, "mildew proofing" should read -- mildewproofing --.

Column 15,
Line 5, "Ink" should read -- ink --.
Line 12, "Ink" should read -- ink --.
Line 14, "Ink" should read -- ink --.
Line 16, "for blue" should read -- for red, a color ink comprising a coloring material for blue --.

Column 16,
Line 41, "highest-quality" should read -- higher-quality --.

Column 17,
Line 32, "cantilever" should read -- cantilever. --.

Column 18,
Line 14, "blade. 61" should read -- blade 61 --.
Line 50, "orifices" should read -- orifices. --.

Column 19,
Line 62, "Ink-jet" should read -- ink-jet --.

Column 20,
Line 33, "its." should read -- its --.
Line 52, "Invention," should read -- invention, --.
Line 58, "used" should read -- used. --.

Column 21,
Line 10, "In" should read -- in --.

Column 22,
Line 15, "FIGS. 21 to" should read -- FIGS. 21 to 28. --.

Column 29,
Line 44, "Ink-jet" should read -- ink-jet --.

UNITED STATES PATENT AND TRADEMARK OFFICE
CERTIFICATE OF CORRECTION

PATENT NO. : 6,521,034 B1
DATED : February 18, 2003
INVENTOR(S) : Koichi Osumi et al.

It is certified that error appears in the above-identified patent and that said Letters Patent is hereby corrected as shown below:

Column 32,
Line 15, "product-of" should read -- product of --.

Column 33,
Line 25, "Ph-COO(M)," should read -- Ph-COO($M^1$), --.

Column 34,
Line 9, "Is" should read -- is --.
Line 36, "In" should read -- in --.
Line 44, "($M^1$)$CO_{31}$" should read -- ($M^1$)$CO_3$, --.
Line 51, "one-salt" should read -- one salt --.
Line 53, "(ML)$NO_3$," should read -- ($M^1$)$NO_3$, --.

Column 35,
Line 10, "($M^1$I)$_2$" should read -- ($M^1$)$_2SO_4$, --.
Line 11, "$SO_4$," should be deleted.
Line 18, "In" should read -- in --.
Line 23, "Ink" should read -- ink --.

Column 36,
Line 22, "surface second" should read -- surface thereof, the second --.
Line 31, "In" should read -- in --.

Signed and Sealed this

Third Day of February, 2004

JON W. DUDAS
*Acting Director of the United States Patent and Trademark Office*